United States Patent
Duncklee et al.

(10) Patent No.: US 12,196,883 B2
(45) Date of Patent: Jan. 14, 2025

(54) DYNAMIC LOADING OF RADAR UNIT CONFIGURATION DATA BASED ON CHANGING RADAR PARAMETERS

(71) Applicant: Waymo LLC, Mountain View, CA (US)

(72) Inventors: Kevin Duncklee, Mountain View, CA (US); Brett Coon, Mountain View, CA (US); Filip Perich, Santa Clara, CA (US)

(73) Assignee: Waymo LLC, Mountain View, CA (US)

( * ) Notice: Subject to any disclaimer, the term of this patent is extended or adjusted under 35 U.S.C. 154(b) by 0 days.

(21) Appl. No.: 18/468,312

(22) Filed: Sep. 15, 2023

(65) Prior Publication Data
US 2024/0004029 A1    Jan. 4, 2024

Related U.S. Application Data

(63) Continuation of application No. 16/715,448, filed on Dec. 16, 2019, now Pat. No. 11,796,633.

(51) Int. Cl.
*G01S 7/40* (2006.01)
*G01S 7/00* (2006.01)
(Continued)

(52) U.S. Cl.
CPC ............... *G01S 7/40* (2013.01); *G01S 7/003* (2013.01); *G01S 7/352* (2013.01); *G01S 13/931* (2013.01);
(Continued)

(58) Field of Classification Search
CPC ... G01S 2013/9316; G01S 2013/93274; G01S 2013/93273; G01S 7/003; G01S 7/023; G01S 7/352; G01S 13/931
See application file for complete search history.

(56) References Cited

U.S. PATENT DOCUMENTS 4,489,322 A * 12/1984 Zulch .................... G01S 13/867
                                                        342/149
5,345,470 A    9/1994 Alexander
(Continued)

FOREIGN PATENT DOCUMENTS

DE    102017011035 A1    5/2018
DE    102018205444 A1    10/2019

OTHER PUBLICATIONS

International Search Report and Written Opinion for corresponding PCT application No. PCT/US2020/065243, dated Apr. 19, 2021.

*Primary Examiner* — Peter M Bythrow
(74) *Attorney, Agent, or Firm* — McDonnell Boehnen Hulbert & Berghoff LLP

(57) ABSTRACT

A method and a radar system are provided in the present disclosure. The radar system includes a radar unit having an antenna array configured to transmit and receive radar signal and a memory configured to store radar calibration parameters and radar channel parameters corresponding to the radar unit. The method provides for operation of the radar system. The radar system also includes a radar processor. The radar processor is configured to cause transmission of radar signals by the antenna array based on the radar channel parameters. The radar processor is also configured to process received radar signals based on the radar calibration parameters. The radar system further includes a central vehicle controller configured to operate a vehicle based on the processed radar signals.

20 Claims, 10 Drawing Sheets

(51) Int. Cl.
*G01S 7/35* (2006.01)
*G01S 13/931* (2020.01)

(52) U.S. Cl.
CPC ............... *G01S 2013/93273* (2020.01); *G01S 2013/93274* (2020.01)

(56) References Cited

U.S. PATENT DOCUMENTS

| | | | | |
|---|---|---|---|---|
| 6,393,370 | B1* | 5/2002 | Soika | G01S 7/52004 |
| | | | | 702/33 |
| 6,611,741 | B2* | 8/2003 | Michi | G01S 13/931 |
| | | | | 701/79 |
| 6,927,725 | B2* | 8/2005 | Wittenberg | G01S 7/4004 |
| | | | | 342/174 |
| 6,977,609 | B2* | 12/2005 | Pleva | G01S 7/354 |
| | | | | 342/28 |
| 7,522,092 | B2 | 4/2009 | Okai | |
| 7,633,431 | B1* | 12/2009 | Wey | G01S 13/95 |
| | | | | 342/75 |
| 7,965,225 | B1* | 6/2011 | Dickerson | G01S 13/953 |
| | | | | 342/75 |
| 8,068,134 | B2* | 11/2011 | Yoshizawa | G06V 20/58 |
| | | | | 348/148 |
| 8,692,707 | B2* | 4/2014 | Lee | G01S 13/931 |
| | | | | 342/174 |
| 10,591,584 | B2* | 3/2020 | Bialer | G01S 7/4004 |
| 11,163,055 | B2* | 11/2021 | Schroder | H04B 7/0413 |
| 2007/0013576 | A1 | 1/2007 | Shingyoji | |
| 2008/0211708 | A1* | 9/2008 | Haberland | G01S 7/4004 |
| | | | | 342/70 |
| 2010/0076710 | A1* | 3/2010 | Hukkeri | G01S 7/4004 |
| | | | | 702/97 |
| 2011/0163906 | A1 | 7/2011 | Yang | |
| 2011/0163909 | A1* | 7/2011 | Jeong | H01Q 25/002 |
| | | | | 342/374 |
| 2015/0012172 | A1* | 1/2015 | Hegemann | G01S 13/862 |
| | | | | 701/33.1 |
| 2015/0066412 | A1 | 3/2015 | Nordbruch | |
| 2016/0061935 | A1* | 3/2016 | McCloskey | G01S 7/4008 |
| | | | | 342/82 |
| 2016/0146931 | A1* | 5/2016 | Rao | G01S 13/931 |
| | | | | 342/59 |
| 2016/0320481 | A1* | 11/2016 | Ling | G01S 13/87 |
| 2016/0334511 | A1* | 11/2016 | Ling | G01S 13/931 |
| 2017/0023663 | A1* | 1/2017 | Subburaj | G01S 7/036 |
| 2017/0212215 | A1* | 7/2017 | Hellinger | G01S 13/931 |
| 2017/0248688 | A1* | 8/2017 | Campbell | G01S 7/4026 |
| 2017/0307728 | A1 | 10/2017 | Uhnder | |
| 2018/0074191 | A1* | 3/2018 | Bilik | G01S 13/93 |
| 2019/0025405 | A1* | 1/2019 | Liu | G01S 7/4026 |
| 2019/0185007 | A1 | 6/2019 | Mielenz | |
| 2019/0235048 | A1 | 8/2019 | Lim et al. | |
| 2019/0235050 | A1* | 8/2019 | Maligeorgos | G01S 7/032 |
| 2020/0122740 | A1* | 4/2020 | Fritzson | G01S 13/931 |
| 2020/0210887 | A1* | 7/2020 | Jain | G01S 7/4972 |
| 2020/0300965 | A1* | 9/2020 | Wu | G01S 13/505 |
| 2020/0363501 | A1* | 11/2020 | Lau | G01S 15/931 |
| 2020/0410715 | A1* | 12/2020 | Cadien | G01S 13/867 |
| 2021/0080536 | A1* | 3/2021 | Mayer | G01S 13/343 |
| 2021/0089058 | A1* | 3/2021 | Stoschek | G01S 17/933 |
| 2021/0152245 | A1* | 5/2021 | Slobodyanyuk | H04B 10/272 |
| 2021/0276579 | A1* | 9/2021 | Mielenz | B60W 50/0225 |
| 2021/0349201 | A1* | 11/2021 | Trummer | G01S 7/4021 |

* cited by examiner

DYNAMIC LOADING OF RADAR UNIT CONFIGURATION DATA BASED ON CHANGING RADAR PARAMETERS

CROSS REFERENCE TO RELATED APPLICATION

The present application is a continuation of U.S. patent application Ser. No. 16/715,448, filed on Dec. 16, 2019, the entire contents is hereby incorporated by reference.

BACKGROUND

Radio detection and ranging (RADAR) systems can be used to actively estimate range, angle, and/or Doppler frequency shift to environmental features by emitting radio signals and detecting returning reflected signals. Distances to radio-reflective features can be determined according to the time delay between transmission and reception. The radar system can emit a signal that varies in frequency over time, such as a signal with a time-varying frequency ramp, and then relate the difference in frequency between the emitted signal and the reflected signal to determine a range estimate. Some systems may also estimate relative motion of reflective objects based on Doppler frequency shifts in the received reflected signals.

In some examples, directional antennas can be used for the transmission and/or reception of signals to associate each range estimate with a bearing. More generally, directional antennas can also be used to focus radiated energy on a given field of view of interest. Combining the measured distances and the directional information can enable the surrounding environment features to be mapped. In other examples, non-directional antennas can be alternatively used. In these examples, a receiving antenna may have a 90 degree field of view, and may be configured to utilize multiple channels with a phase offset to determine angle of arrival of the received signal. The radar sensor can be used, for instance, by an autonomous vehicle control system to avoid obstacles indicated by the sensor information. Some example automotive radar systems may be configured to operate within an electromagnetic wave frequency range of 76-81 Giga-Hertz (GHz). These radar systems may use transmission antennas that can focus the radiated energy into tight beams in order to enable receiving antennas (e.g., antennas having wide angle beams) in the radar system to measure an environment of the vehicle with high accuracy.

SUMMARY

In one example, a radar system is provided. The radar system includes a radar unit having an antenna array configured to transmit and receive radar signal and a memory configured to store radar calibration parameters and radar channel parameters corresponding to the radar unit. The radar system also includes a radar processor. The radar processor is configured to cause transmission of radar signals by the antenna array based on the radar channel parameters. The radar processor is also configured to process received radar signals based on the radar calibration parameters. The radar system further includes a central vehicle controller configured to operate a vehicle based on the processed radar signals.

In another example, a method of operating a radar system is provided. The method includes communicating, by a central vehicle controller, an indication of a channel assignment to a radar unit. The method further includes looking up radar channel parameters based on the indication by a radar processor of the radar unit, where the radar channel parameters are stored in a memory of a radar unit. The method further includes transmitting a radar signal by the radar unit. The method also includes receiving radar reflections by the radar unit. Additionally, the method includes processing the radar signals by the radar processor, based on calibration data stored in the memory of the radar unit. Yet further, the method includes communicating, by the radar processing unit, the processed radar signals to the central vehicle controller.

In yet another example, a non-transitory computer readable medium having stored thereon executable instructions that, upon execution by a computing device, cause the computing device to perform functions is provided. The functions include communicating an indication of a channel assignment to a radar unit. The functions also include looking up channel parameters based on the indication of the channel assignment, where the channel parameters are stored in a memory of a radar unit. Additionally, the functions include causing the transmission of a radar signal and receiving radar reflections. Moreover, the functions include processing the radar signals, based on calibration data stored in the memory of the radar unit. Yet further, the instructions include communicating the processed radar signals to the central vehicle controller.

These as well as other aspects, advantages, and alternatives, will become apparent to those of ordinary skill in the art by reading the following detailed description, with reference where appropriate to the accompanying figures.

DETAILED DESCRIPTION

Figure 1:
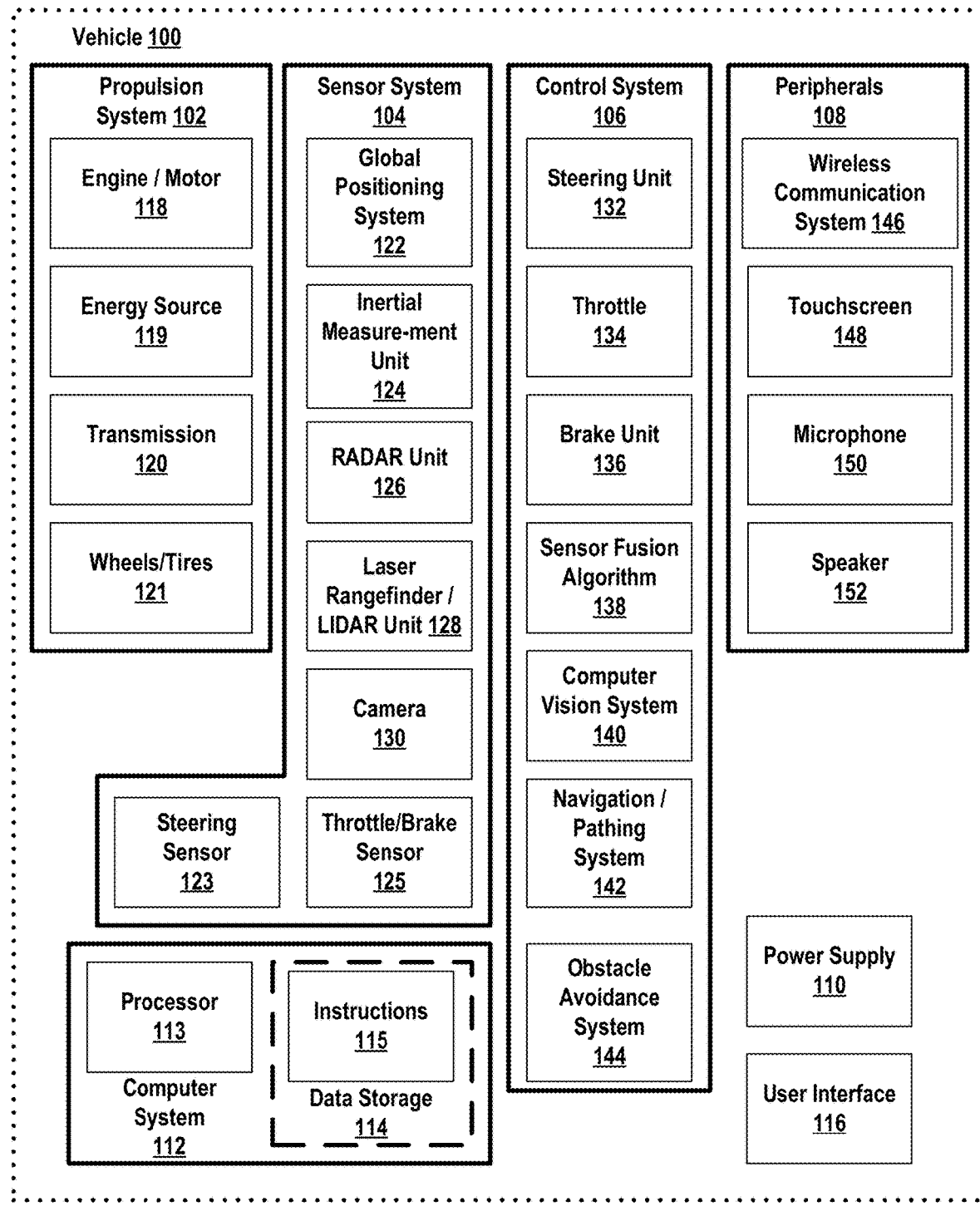
FIG. 1 is a functional block diagram depicting aspects of an example autonomous vehicle.

The following detailed description describes various features and functions of the disclosed systems and methods with reference to the accompanying figures. In the figures, similar symbols identify similar components, unless the context dictates otherwise. The illustrative system, device and method embodiments described herein are not meant to be limiting. It may be readily understood by those skilled in the art that certain aspects of the disclosed systems, devices and methods can be arranged and combined in a wide variety of different configurations, all of which are contemplated herein.

Continued efforts to improve vehicle safety include the development of autonomous vehicles equipped with accident-avoidance systems that may have the ability to avoid accidents. Various sensors, such as radio detection and ranging (RADAR) sensors and light detection and ranging (LIDAR) sensors among other possibilities, may be used by an autonomous vehicle to detect obstacles and/or other vehicles in an environment of the autonomous vehicle and thereby facilitate accident avoidance. However, as more vehicles adopt such accident-avoidance systems and the density of sensor equipped vehicles increases, interference might arise between the sensors of different vehicles that can reduce accuracy and the effectiveness of using the sensors for accident avoidance.

In addition, radar systems on vehicles, whether to enable more autonomous functions or to improve safe manual driving operations, are becoming more powerful and more prevalent. Thus, radars are more likely to interfere with other radars, both those located on other vehicles as well as those located on the same vehicle. Additionally, radar continues to increase in precision, which can increase the radar reliance on more precise calibration. The present application is directed towards example systems and methods that can improve the operation of vehicular radar systems.

The present system includes a central vehicle controller. The central vehicle controller may be a processor configured to control operations of various vehicle systems, such as systems controlling and enabling autonomous operations. In practice, the central vehicle controller may be communicably coupled to at least one radar unit of a vehicle. Additionally, the central controller may be wirelessly coupled to a remote computing system. The remote computing system may be able to wirelessly provide data to the central vehicle controller. The central vehicle controller may store the received data in a memory, such as local memory at the vehicle and/or memory positioned remotely from the vehicle.

The data received by the central processor may contain calibration or configuration information for each radar unit coupled to the vehicle. In some examples, when a radar unit is installed on a vehicle, an identification number of the radar unit may be stored in the remote computer system. Additionally, when a radar unit is calibrated, the calibration data may be stored in the remote computer system. When a vehicle is turned on (or an initiation sequence on a vehicle is performed), the vehicle may initiate wireless communication between itself and the remote computing system. The remote computing system may send the calibration or configuration data for each respective radar unit of the vehicle to the central vehicle controller (or alternatively calibration or configuration data for a subset of radar units of the vehicle). The remote computer system may also communicate a specific set of configuration data, e.g., a set of channel assignments, to the central vehicle controller. The set of channel assignments may include, for example, channel frequency, timing, and/or modulations for the operation of one or more radar unit(s) of the vehicle.

The central vehicle controller may communicate calibration or configuration information to a processor, a memory, and/or other components of each respective radar unit of the vehicle based on a serial number of the radar unit. By communicating the calibration and/or configuration information to the radar units, the respective radar units may be controlled and data from them may be processed, based on a calibration or configuration of the radar unit. Further, the central processing unit may also communicate the set of channel assignments to the memory of each respective radar unit. Thus, a radar processor of the radar unit may be able to look up information for a given channel assignment when operating the radar unit.

During the operation of the autonomous vehicle, it may be desirable for a radar unit of the vehicle to avoid interfering with other radar units (either of the same vehicle or other vehicles). In order to mitigate potential interference, the various radar units may operate with channel and timing schemes that are configured to mitigate interference. In some instances, the vehicle itself may determine channel and timing information for the radar operation. In other examples, a central radar planning system may determine the radar channel and timing information.

For a given radar unit to operate, it may receive data related to channel assignment from a computational unit of the vehicle. A processor of the radar system may be configured to look up parameters for the operation of the radar unit from a memory of the respective radar unit and/or a central memory storing parameters for multiple radar units. In some instances, the memory may be a random access memory (RAM) or another type of memory, such as registers coupled to the radar processor. The radar processor may operate the radar unit with the channel and timing information from the memory based on the data provided by the computational unit of the vehicle.

In some instances, the computational unit of the vehicle may periodically communicate new data to a radar unit. The radar unit may responsively look up new information for the operation of the radar unit based on the new data. In some instances, the computational unit may send a set of data to a radar unit, which provides information for the operation of the radar unit over a given period of time. For example, the computational unit may send a plurality of radar configurations or radar channel assignments to the radar units, which the radar units can then use to dynamically change configuration as needed and/or appropriate. This enables quick switching by the radar units between multiple configurations. For example, in one embodiment, the central vehicle controller may receive from a remote computing system a channel assignment or indication of a channel assignment for the radar unit. The channel assignment or indication of the channel assignment may be a plurality of channel assignments for the radar unit. The radar unit may then be able to use the plurality of channel assignments to quickly and dynamically switch between multiple configurations during a certain period of time.

Thus, the present system includes a memory of each radar unit. The memory may be configured to store calibration or configuration parameters for the respective radar unit. The memory may also be able to store data related to channel operations of the radar unit. The channel operation information may include, frequency, timing, and modulation information. When the radar unit is operated, a radar processor of the radar unit may be able to use this information from the memory to operate the radar unit.

The embodiments disclosed herein may be used on any type of vehicle, including conventional automobiles and automobiles having an autonomous mode of operation. However, the term "vehicle" is to be broadly construed to cover any moving object, including, for instance, a truck, a van, a semitrailer truck, a motorcycle, a golf cart, an off-road vehicle, a warehouse transport vehicle, or a farm vehicle, as well as a carrier that rides on a track such as a rollercoaster, trolley, tram, or train car, among other examples. Furthermore, although example vehicles are shown and described as vehicles that may be configured to operate in autonomous mode, the embodiments described herein are also applicable to vehicles that are not configured to operate autonomously. Thus, the example vehicles are not meant to limit the present disclosure to autonomous vehicles.

FIG. 1 is a functional block diagram illustrating a vehicle 100 according to an example embodiment. The vehicle 100 is configured to operate fully or partially in an autonomous mode, and thus may be referred to as an "autonomous vehicle." For example, a computer system 112 can control the vehicle 100 while in an autonomous mode via control instructions to a control system 106 for the vehicle 100. The computer system 112 can receive information from one or more sensor systems 104 and can base one or more control processes (such as setting a heading so as to avoid a detected obstacle) upon the received information in an automated fashion.

The autonomous vehicle 100 can be operated in a fully autonomous mode or partially autonomous mode. In the partially autonomous mode, some functions can optionally be manually controlled (e.g., by a driver) some or all of the time. Further, the vehicle can be configured to switch between a fully-manual operation mode (i.e., controlled by a driver) and a partially-autonomous and/or a fully-autonomous operation mode.

The vehicle 100 includes a propulsion system 102, a sensor system 104, a control system 106, one or more peripherals 108, a power supply 110, a computer system 112, and a user interface 116. The vehicle 100 may include more or fewer subsystems and each subsystem can optionally include multiple components. Further, each of the subsystems and components of vehicle 100 can be interconnected and/or in communication. Thus, one or more of the functions of the vehicle 100 described herein can optionally be divided between additional functional or physical components, or combined into fewer functional or physical components. In some further examples, additional functional and/or physical components may be added to the examples illustrated by FIG. 1.

The propulsion system 102 can include components operable to provide powered motion to the vehicle 100. In some embodiments, the propulsion system 102 includes an engine/motor 118, an energy source 119, a transmission 120, and wheels/tires 121. The engine/motor 118 converts energy source 119 to mechanical energy. In some embodiments, the propulsion system 102 can optionally include one or both of engines and/or motors. For example, a gas-electric hybrid vehicle can include both a gasoline/diesel engine and one or more electric motors.

The energy source 119 represents a source of energy, such as electrical and/or chemical energy, that may, in full or in part, power the engine/motor 118. That is, the engine/motor 118 can be configured to convert the energy source 119 to mechanical energy to operate the transmission. In some embodiments, the energy source 119 can include gasoline, diesel, other petroleum-based fuels, propane, other compressed gas-based fuels, ethanol, solar panels, batteries, capacitors, flywheels, regenerative braking systems, and/or other sources of electrical power, etc. The energy source 119 can also provide energy for other systems of the vehicle 100.

The transmission 120 includes appropriate gears and/or mechanical elements suitable to convey the mechanical power from the engine/motor 118 to the wheels/tires 121. In some embodiments, the transmission 120 includes a gearbox, a clutch, a differential, a drive shaft, and/or axle(s), etc.

The wheels/tires 121 are arranged to stably support the vehicle 100 while providing frictional traction with a surface, such as a road, upon which the vehicle 100 moves. Accordingly, the wheels/tires 121 are configured and arranged according to the nature of the vehicle 100. For example, the wheels/tires can be arranged as a unicycle, bicycle, motorcycle, tricycle, or car/truck four-wheel format. Other wheel/tire geometries are possible, such as those including six or more wheels. Any combination of the wheels/tires 121 of vehicle 100 may be operable to rotate differentially with respect to other wheels/tires 121. The wheels/tires 121 can optionally include at least one wheel that is rigidly attached to the transmission 120 and at least one tire coupled to a rim of a corresponding wheel that makes contact with a driving surface. The wheels/tires 121 may include any combination of metal and rubber, and/or other materials or combination of materials.

The sensor system 104 generally includes one or more sensors configured to detect information about the environment surrounding the vehicle 100. For example, the sensor system 104 can include a Global Positioning System (GPS) 122, an inertial measurement unit (IMU) 124, a RADAR unit 126, a laser rangefinder/LIDAR unit 128, a camera 130, humidity sensors and/or a microphone 131. The sensor system 104 could also include sensors configured to monitor internal systems of the vehicle 100 (e.g., 02 monitor, fuel gauge, engine oil temperature, wheel speed sensors, etc.). One or more of the sensors included in sensor system 104 could be configured to be actuated separately and/or collectively in order to modify a position and/or an orientation of the one or more sensors.

The GPS 122 is a sensor configured to estimate a geographic location of the vehicle 100. To this end, GPS 122 can include a transceiver operable to provide information regarding the position of the vehicle 100 with respect to the Earth.

The IMU 124 can include any combination of sensors (e.g., accelerometers and gyroscopes) configured to sense position and orientation changes of the vehicle 100 based on inertial acceleration.

The RADAR unit 126 can represent a system that utilizes radio signals to sense objects within the local environment of the vehicle 100. In some embodiments, in addition to sensing the objects, the RADAR unit 126 and/or the computer system 112 can additionally be configured to sense the speed and/or heading of the objects.

Similarly, the laser rangefinder or LIDAR unit 128 can be any sensor configured to sense objects in the environment in which the vehicle 100 is located using lasers. The laser rangefinder/LIDAR unit 128 can include one or more laser sources, a laser scanner, and one or more detectors, among other system components. The laser rangefinder/LIDAR unit 128 can be configured to operate in a coherent (e.g., using heterodyne detection) or an incoherent detection mode.

The camera 130 can include one or more devices configured to capture a plurality of images of the environment surrounding the vehicle 100. The camera 130 can be a still camera or a video camera. In some embodiments, the camera 130 can be mechanically movable such as by rotating and/or tilting a platform to which the camera is mounted. As such, a control process of vehicle 100 may be implemented to control the movement of camera 130.

The sensor system 104 can also include a microphone. The microphone can be configured to capture sound from the environment surrounding vehicle 100. In some cases, multiple microphones can be arranged as a microphone array, or possibly as multiple microphone arrays.

The control system 106 is configured to control operation(s) regulating acceleration of the vehicle 100 and its components. To effect acceleration, the control system 106 includes a steering unit 132, throttle 134, brake unit 136, a sensor fusion algorithm 138, a computer vision system 140, a navigation/pathing system 142, and/or an obstacle avoidance system 144, etc.

The steering unit 132 is operable to adjust the heading of vehicle 100. For example, the steering unit can adjust the axis (or axes) of one or more of the wheels/tires 121 so as to effect turning of the vehicle. The throttle 134 is configured to control, for instance, the operating speed of the engine/motor 118 and, in turn, adjust forward acceleration of the vehicle 100 via the transmission 120 and wheels/tires 121. The brake unit 136 decelerates the vehicle 100. The brake unit 136 can use friction to slow the wheels/tires 121. In some embodiments, the brake unit 136 inductively decelerates the wheels/tires 121 by a regenerative braking process to convert kinetic energy of the wheels/tires 121 to electric current.

The sensor fusion algorithm 138 is an algorithm (or a computer program product storing an algorithm) configured to accept data from the sensor system 104 as an input. The data may include, for example, data representing information sensed at the sensors of the sensor system 104. The sensor fusion algorithm 138 can include, for example, a Kalman filter, Bayesian network, etc. The sensor fusion algorithm 138 provides assessments regarding the environment surrounding the vehicle based on the data from sensor system 104. In some embodiments, the assessments can include evaluations of individual objects and/or features in the environment surrounding vehicle 100, evaluations of particular situations, and/or evaluations of possible interference between the vehicle 100 and features in the environment (e.g., such as predicting collisions and/or impacts) based on the particular situations.

The computer vision system 140 can process and analyze images captured by camera 130 to identify objects and/or features in the environment surrounding vehicle 100. The detected features/objects can include traffic signals, roadway boundaries, other vehicles, pedestrians, and/or obstacles, etc. The computer vision system 140 can optionally employ an object recognition algorithm, a Structure From Motion (SFM) algorithm, video tracking, and/or available computer vision techniques to effect categorization and/or identification of detected features/objects. In some embodiments, the computer vision system 140 can be additionally configured to map the environment, track perceived objects, estimate the speed of objects, etc.

The navigation and pathing system 142 is configured to determine a driving path for the vehicle 100. For example, the navigation and pathing system 142 can determine a series of speeds and directional headings to effect movement of the vehicle along a path that substantially avoids perceived obstacles while generally advancing the vehicle along a roadway-based path leading to an ultimate destination, which can be set according to user inputs via the user interface 116, for example. The navigation and pathing system 142 can additionally be configured to update the driving path dynamically while the vehicle 100 is in operation on the basis of perceived obstacles, traffic patterns, weather/road conditions, etc. In some embodiments, the navigation and pathing system 142 can be configured to incorporate data from the sensor fusion algorithm 138, the GPS 122, and one or more predetermined maps so as to determine the driving path for vehicle 100.

The obstacle avoidance system 144 can represent a control system configured to identify, evaluate, and avoid or otherwise negotiate potential obstacles in the environment surrounding the vehicle 100. For example, the obstacle avoidance system 144 can effect changes in the navigation of the vehicle by operating one or more subsystems in the control system 106 to undertake swerving maneuvers, turning maneuvers, braking maneuvers, etc. In some embodiments, the obstacle avoidance system 144 is configured to automatically determine feasible ("available") obstacle avoidance maneuvers on the basis of surrounding traffic patterns, road conditions, etc. For example, the obstacle avoidance system 144 can be configured such that a swerving maneuver is not undertaken when other sensor systems detect vehicles, construction barriers, other obstacles, etc. in the region adjacent the vehicle that would be swerved into. In some embodiments, the obstacle avoidance system 144 can automatically select the maneuver that is both available and maximizes safety of occupants of the vehicle. For example, the obstacle avoidance system 144 can select an avoidance maneuver predicted to cause the least amount of acceleration in a passenger cabin of the vehicle 100.

The vehicle 100 also includes peripherals 108 configured to allow interaction between the vehicle 100 and external sensors, other vehicles, other computer systems, and/or a user, such as an occupant of the vehicle 100. For example, the peripherals 108 for receiving information from occupants, external systems, etc. can include a wireless communication system 146, a touchscreen 148, a microphone 150, and/or a speaker 152.

In some embodiments, the peripherals 108 function to receive inputs for a user of the vehicle 100 to interact with the user interface 116. To this end, the touchscreen 148 can both provide information to a user of vehicle 100, and convey information from the user indicated via the touchscreen 148 to the user interface 116. The touchscreen 148 can be configured to sense both touch positions and touch gestures from a user's finger (or stylus, etc.) via capacitive sensing, resistance sensing, optical sensing, a surface acoustic wave process, etc. The touchscreen 148 can be capable of sensing finger movement in a direction parallel or planar to the touchscreen surface, in a direction normal to the touchscreen surface, or both, and may also be capable of sensing a level of pressure applied to the touchscreen surface. An occupant of the vehicle 100 can also utilize a voice command interface. For example, the microphone 150 can be configured to receive audio (e.g., a voice command or other audio input) from a user of the vehicle 100. Similarly, the speakers 152 can be configured to output audio to the user of the vehicle 100.

In some embodiments, the peripherals 108 function to allow communication between the vehicle 100 and external systems, such as devices, sensors, other vehicles, etc. within its surrounding environment and/or controllers, servers, etc., physically located far from the vehicle that provide useful information regarding the vehicle's surroundings, such as traffic information, weather information, etc. For example, the wireless communication system 146 can wirelessly communicate with one or more devices directly or via a communication network. The wireless communication system 146 can optionally use 3G cellular communication, such as Code-Division Multiple Access (CDMA), Evolution-Data Optimized (EV-DO), Global System for Mobile communications (GSM)/General Packet Radio Surface (GPRS), and/or 4G cellular communication, such as Worldwide Interoperability for Microwave Access (WiMAX) or Long-Term Evolution (LTE), or other forms of cellular communications. Additionally or alternatively, wireless communication system 146 can communicate with a wireless local area network (WLAN), for example, using WiFi. In some embodiments, wireless communication system 146 could communicate directly with a device, for example, using an infrared link, Bluetooth®, and/or ZigBee®. The wireless communication system 146 can include one or more dedicated short-range communication (DSRC) devices that can include public and/or private data communications between vehicles and/or roadside stations. Other wireless protocols for sending and receiving information embedded in signals, such as various vehicular communication systems, can also be employed by the wireless communication system 146 within the context of the present disclosure.

As noted above, the power supply 110 can provide power to components of vehicle 100, such as electronics in the peripherals 108, computer system 112, sensor system 104, etc. The power supply 110 can include a rechargeable lithium-ion or lead-acid battery for storing and discharging electrical energy to the various powered components, for example. In some embodiments, one or more banks of batteries can be configured to provide electrical power. In some embodiments, the power supply 110 and energy source 119 can be implemented together, as in some all-electric cars.

Many or all of the functions of vehicle 100 can be controlled via computer system 112 that receives inputs from the sensor system 104, peripherals 108, etc., and communicates appropriate control signals to the propulsion system 102, control system 106, peripherals 108, etc. to effect automatic operation of the vehicle 100 based on its surroundings. Computer system 112 includes at least one processor 113 (which can include at least one microprocessor) that executes instructions 115 stored in a non-transitory computer readable medium, such as the data storage 114. The computer system 112 may also represent a plurality of computing devices that serve to control individual components or subsystems of the vehicle 100 in a distributed fashion.

In some embodiments, data storage 114 contains instructions 115 (e.g., program logic) executable by the processor 113 to execute various functions of vehicle 100, including those described above in connection with FIG. 1. Data storage 114 may contain additional instructions as well, including instructions to transmit data to, receive data from, interact with, and/or control one or more of the propulsion system 102, the sensor system 104, the control system 106, and the peripherals 108.

In addition to the instructions 115, the data storage 114 may store data such as roadway maps, path information, among other information. Such information may be used by vehicle 100 and computer system 112 during operation of the vehicle 100 in the autonomous, semi-autonomous, and/or manual modes to select available roadways to an ultimate destination, interpret information from the sensor system 104, etc.

The vehicle 100, and associated computer system 112, provides information to and/or receives input from a user of vehicle 100, such as an occupant in a passenger cabin of the vehicle 100. The user interface 116 can accordingly include one or more input/output devices within the set of peripherals 108, such as the wireless communication system 146, the touchscreen 148, the microphone 150, and/or the speaker 152 to allow communication between the computer system 112 and a vehicle occupant.

The computer system 112 controls the operation of the vehicle 100 based on inputs received from various subsystems indicating vehicle and/or environmental conditions (e.g., propulsion system 102, sensor system 104, and/or control system 106), as well as inputs from the user interface 116, indicating user preferences. For example, the computer system 112 can utilize input from the control system 106 to control the steering unit 132 to avoid an obstacle detected by the sensor system 104 and the obstacle avoidance system 144. The computer system 112 can be configured to control many aspects of the vehicle 100 and its subsystems. Generally, however, provisions are made for manually overriding automated controller-driven operation, such as in the event of an emergency, or merely in response to a user-activated override, etc.

The components of vehicle 100 described herein can be configured to work in an interconnected fashion with other components within or outside their respective systems. For example, the camera 130 can capture a plurality of images that represent information about an environment of the vehicle 100 while operating in an autonomous mode. The environment may include other vehicles, traffic lights, traffic signs, road markers, pedestrians, etc. The computer vision system 140 can categorize and/or recognize various aspects in the environment in concert with the sensor fusion algorithm 138, the computer system 112, etc. based on object recognition models pre-stored in data storage 114, and/or by other techniques.

Although the vehicle 100 is described and shown in FIG. 1 as having various components of vehicle 100, e.g., wireless communication system 146, computer system 112, data storage 114, and user interface 116, integrated into the vehicle 100, one or more of these components can optionally be mounted or associated separately from the vehicle 100. For example, data storage 114 can exist, in part or in full, separate from the vehicle 100, such as in a cloud-based server, for example. Thus, one or more of the functional elements of the vehicle 100 can be implemented in the form of device elements located separately or together. The functional device elements that make up vehicle 100 can generally be communicatively coupled together in a wired and/or wireless fashion.

Figure 2A:
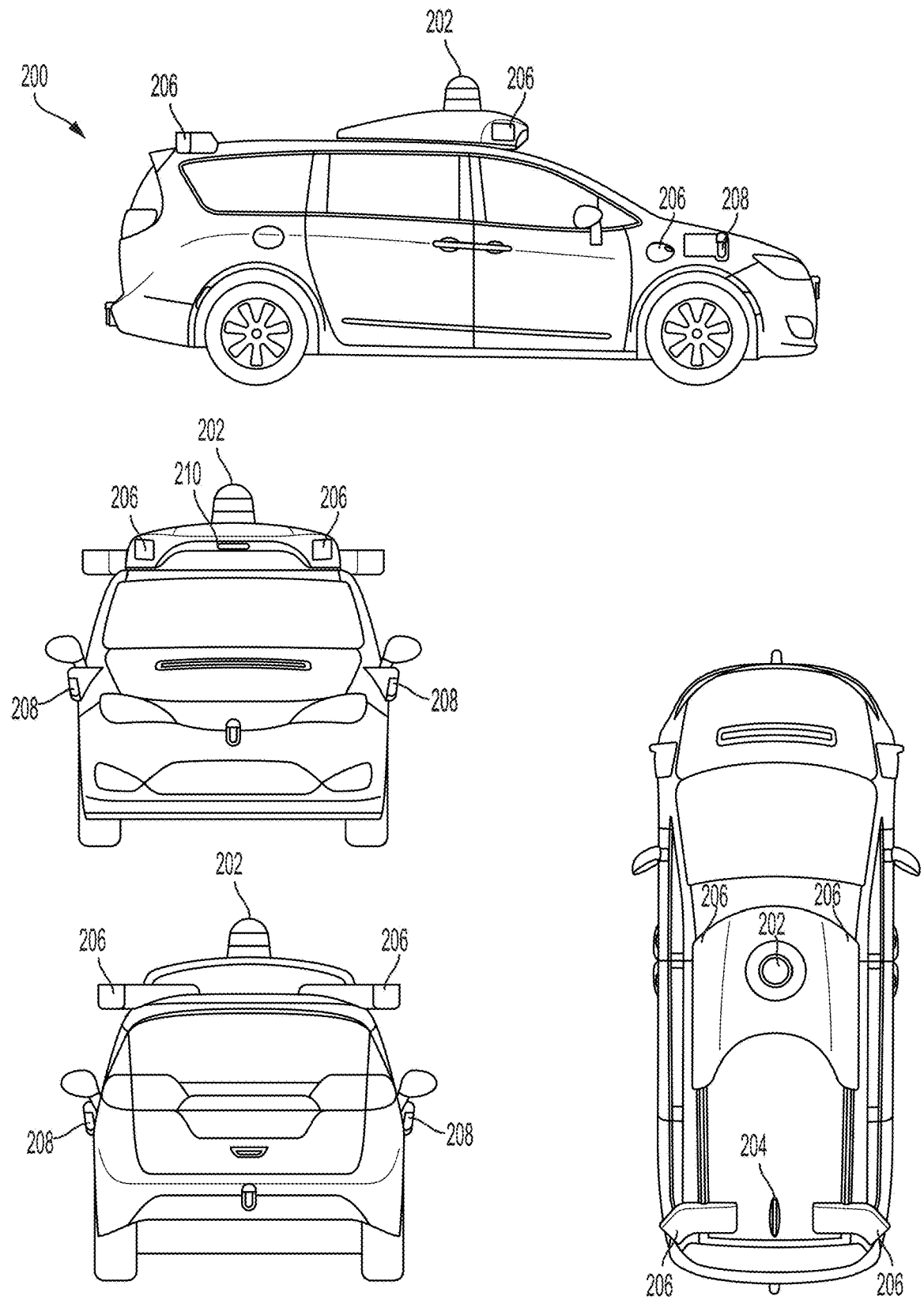
FIG. 2A depicts exterior views of an example autonomous vehicle.

FIG. 2A shows an example vehicle 200 that can include some or all of the functions described in connection with vehicle 100 in reference to FIG. 1. In particular, FIG. 2A shows various different views of vehicle 200. Although vehicle 200 is illustrated in FIG. 2A as a four-wheel van-type car for illustrative purposes, the present disclosure is not so limited. For instance, the vehicle 200 can represent a truck, a van, a semi-trailer truck, a motorcycle, a golf cart, an off-road vehicle, or a farm vehicle, etc.

The example vehicle 200 includes a sensor unit 202, a wireless communication system 204, RADAR units 206, laser rangefinder units 208, and a camera 210. Furthermore, the example vehicle 200 can include any of the components described in connection with vehicle 100 of FIG. 1. The RADAR unit 206 and/or laser rangefinder unit 208 can actively scan the surrounding environment for the presence of potential obstacles and can be similar to the RADAR unit 126 and/or laser rangefinder/LIDAR unit 128 in the vehicle 100.

The sensor unit 202 is mounted atop the vehicle 200 and includes one or more sensors configured to detect information about an environment surrounding the vehicle 200, and output indications of the information. For example, sensor unit 202 can include any combination of cameras, RADARs, LIDARs, range finders, and acoustic sensors. The sensor unit 202 can include one or more movable mounts that could be operable to adjust the orientation of one or more sensors in the sensor unit 202. In one embodiment, the movable mount could include a rotating platform that could scan sensors so as to obtain information from each direction around the vehicle 200. In another embodiment, the movable mount of the sensor unit 202 could be moveable in a scanning fashion within a particular range of angles and/or azimuths. The sensor unit 202 could be mounted atop the roof of a car, for instance, however other mounting locations are possible. Additionally, the sensors of sensor unit 202 could be distributed in different locations and need not be collocated in a single location. Some possible sensor types and mounting locations include RADAR unit 206 and laser rangefinder unit 208. Furthermore, each sensor of sensor unit 202 can be configured to be moved or scanned independently of other sensors of sensor unit 202.

In an example configuration, one or more RADAR scanners (e.g., the RADAR unit 206) can be located near the front of the vehicle 200, to actively scan the region in front of the car 200 for the presence of radio-reflective objects. A RADAR scanner can be situated, for example, in a location suitable to illuminate a region including a forward-moving path of the vehicle 200 without occlusion by other features of the vehicle 200. For example, a RADAR scanner can be situated to be embedded and/or mounted in or near the front bumper, front headlights, cowl, and/or hood, etc. Furthermore, one or more additional RADAR scanning devices can be located to actively scan the side and/or rear of the vehicle 200 for the presence of radio-reflective objects, such as by including such devices in or near the rear bumper, side panels, rocker panels, and/or undercarriage, etc.

The wireless communication system 204 could be located on the roof of the vehicle 200 as depicted in FIG. 2A. Alternatively, the wireless communication system 204 could be located, fully or in part, elsewhere. The wireless communication system 204 may include wireless transmitters and receivers that could be configured to communicate with devices external or internal to the vehicle 200. Specifically, the wireless communication system 204 could include transceivers configured to communicate with other vehicles and/or computing devices, for instance, in a vehicular communication system or a roadway station. Examples of such vehicular communication systems include dedicated short range communications (DSRC), radio frequency identification (RFID), and other proposed communication standards directed towards intelligent transport systems.

The camera 210 can be a photo-sensitive instrument, such as a still camera, a video camera, etc. that is configured to capture a plurality of images of the environment of the vehicle 200. To this end, the camera 210 can be configured to detect visible light, and can additionally or alternatively be configured to detect light from other portions of the spectrum, such as infrared or ultraviolet light. The camera 210 can be a two-dimensional detector, and can optionally have a three-dimensional spatial range of sensitivity. In some embodiments, the camera 210 can include, for example, a range detector configured to generate a two-dimensional image indicating distance from the camera 210 to a number of points in the environment. To this end, the camera 210 may use one or more range detecting techniques.

For example, the camera 210 can provide range information by using a structured light technique in which the vehicle 200 illuminates an object in the environment with a predetermined light pattern, such as a grid or checkerboard pattern and uses the camera 210 to detect a reflection of the predetermined light pattern from environmental surroundings. Based on distortions in the reflected light pattern, the vehicle 200 can determine the distance to the points on the object. The predetermined light pattern may comprise infrared light or radiation at other suitable wavelengths for such measurements.

The camera 210 can be mounted inside a front windshield of the vehicle 200. Specifically, the camera 210 can be situated to capture images from a forward-looking view with respect to the orientation of the vehicle 200. Other mounting locations and viewing angles of camera 210 can also be used, either inside or outside the vehicle 200. Further, the camera 210 can have associated optics operable to provide an adjustable field of view. Further, the camera 210 can be mounted to vehicle 200 with a movable mount to vary a pointing angle of the camera 210, such as via a pan/tilt mechanism.

Figure 2B:
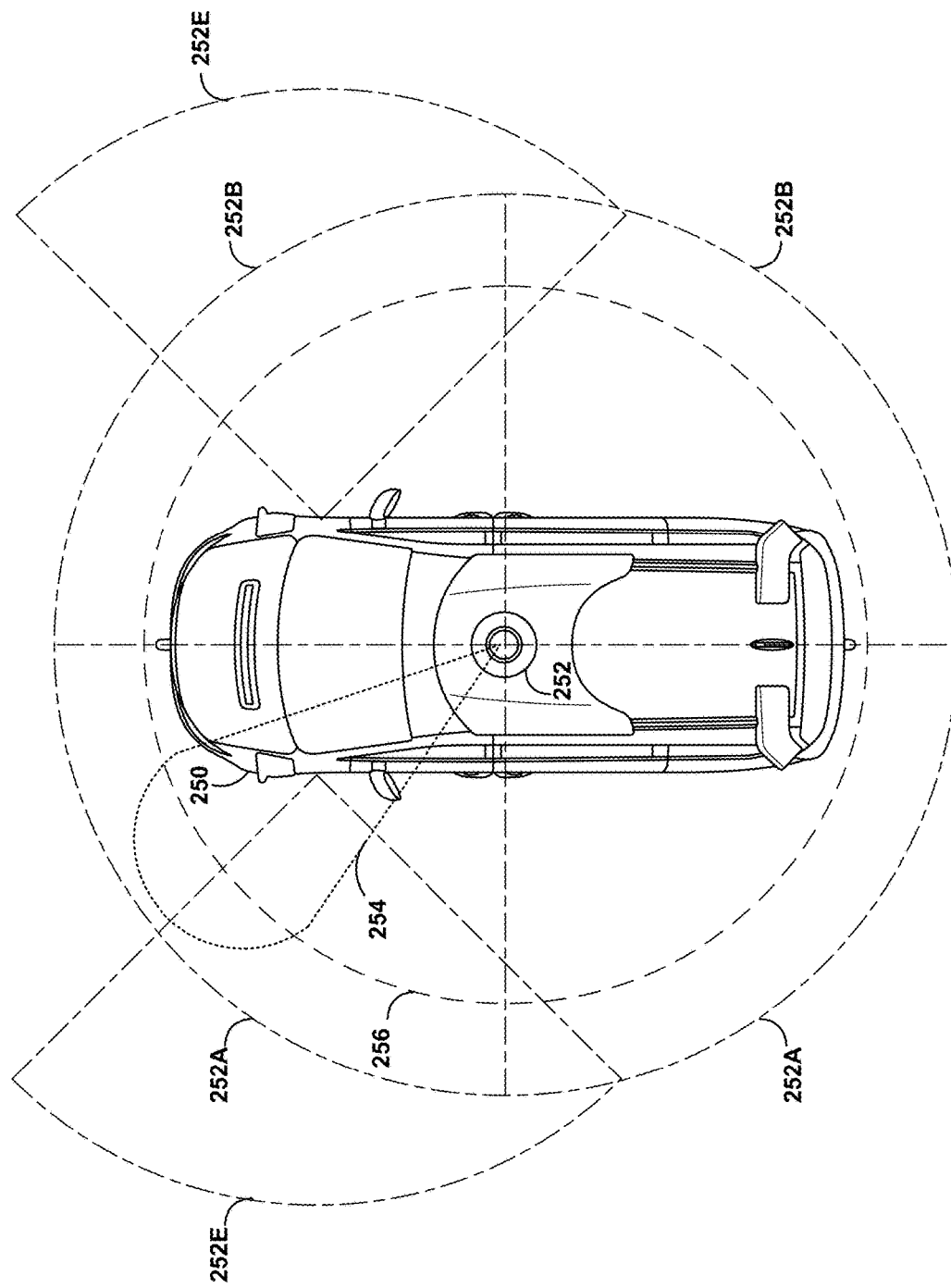
FIG. 2B depicts sensor fields of view of an example autonomous vehicle.

FIG. 2B illustrates an example autonomous vehicle 250 having various sensor fields of view. As previously discussed with respect to FIG. 2A, the vehicle 250 may contain a plurality of sensors. The locations of the various sensors may correspond to the locations of the sensors disclosed in FIG. 2A. However, in some instances, the sensors may have other locations. Sensors locations are omitted from FIG. 2B for simplicity of the drawing. For each sensor unit of vehicle 250, FIG. 2B shows a respective field of view. The field of view of a sensor may include an angular region over which the sensor may detect objects and a range that corresponds to maximum distance from the sensor at which the sensor may reliable detect objects.

The vehicle 250 may include six radar units. A first radar unit may be located on the front-left of the vehicle and have an angular field of view corresponding to the angular portion of field of view 252A. A second radar unit may be located on the front-right of the vehicle and have an angular field of view corresponding to the angular portion of field of view 252B. A third radar unit may be located on the rear-left of the vehicle and have an angular field of view corresponding to the angular portion of field of view 252C. A fourth radar unit may be located on the rear-right of the vehicle and have an angular field of view corresponding to the angular portion of field of view 252D. A fifth radar unit may be located on the left side of the vehicle and have an angular field of view corresponding to the angular portion of field of view 252E. A sixth radar unit may be located on the right side of the vehicle and have an angular field of view corresponding to the angular portion of field of view 252F. Each of the six radar units may be configured with a scan-able beam width of 90 degrees. A radar beam width may be smaller than 90 degrees, but each radar unit may be able to steer the radar beam across the 90-degree field of view.

A first LIDAR unit of the vehicle 250 may be configured to scan the full 360-degree region around the vehicle as shown by an angular field of view corresponding to the angular portion of field of view 254. A second LIDAR unit of the vehicle 250 may be configured to scan a region smaller than the 360-degree region around the vehicle. In one example, the second LIDAR unit may have a field of view smaller than 10 degrees in the horizontal plant as shown by an angular field of view corresponding to the angular portion of field of view 254.

Additionally, the vehicle may also include at least one camera. The camera may be an optical camera and/or an infrared camera.

In addition to the field of view for each of the various sensors of vehicle 250, each sensor may also have a corresponding range. In one example, the range of the radar units may be greater than the range of either LIDAR unit, as shown by the field of the views of the radar units 252A-252E extending further than the fields of view for the LIDAR units 254 and 256. Additionally, the second LIDAR unit may have a range that is greater than a range of the first LIDAR unit, as shown by field of view 256 extending further than field of view 254. In various examples, the range of the camera may be greater than or less than the range of the other sensors.

Figure 3:
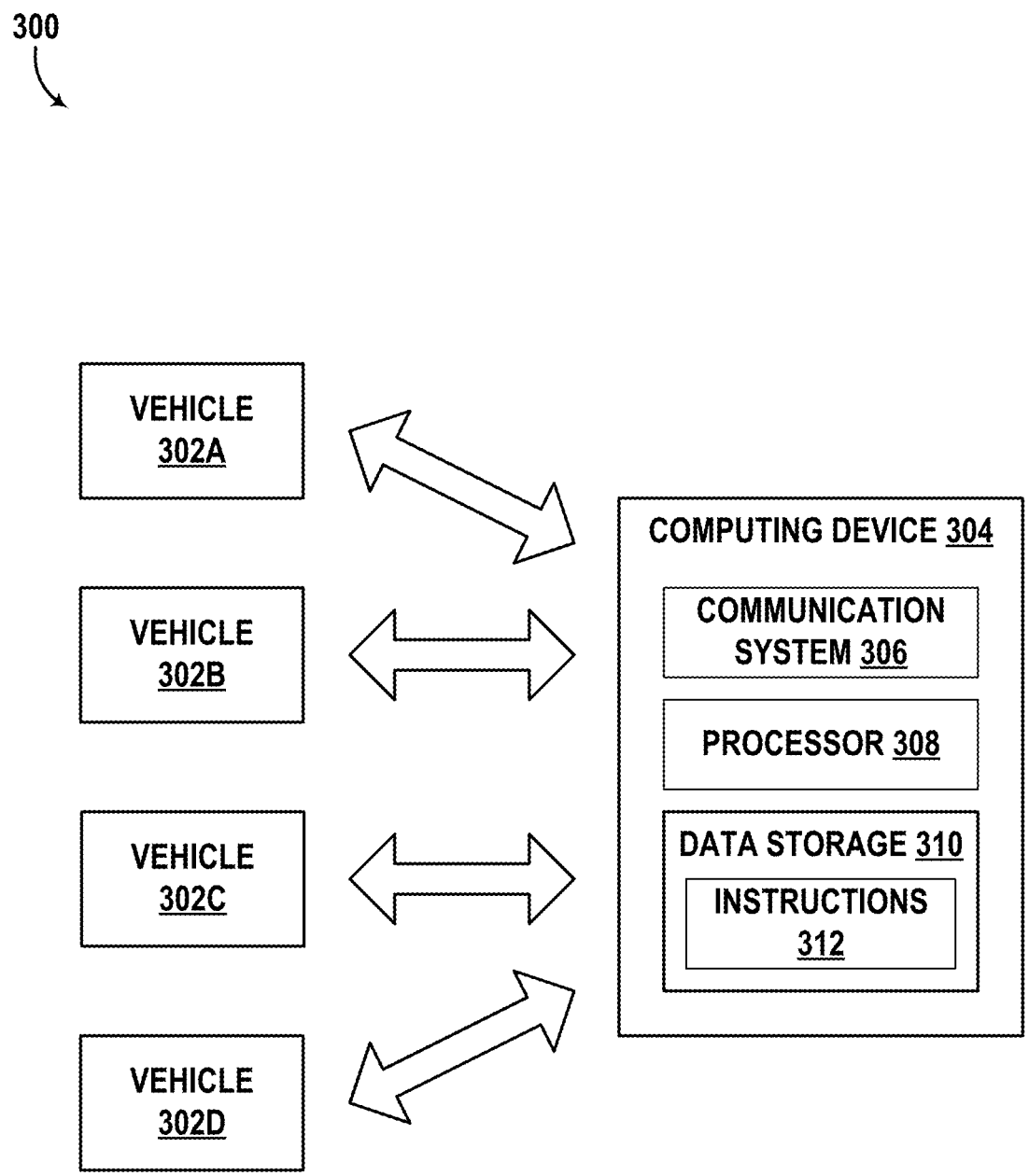
FIG. 3 is a simplified block diagram of a system, according to an example embodiment.

FIG. 3 is a simplified block diagram of a system 300, according to an example embodiment. The system 300 includes vehicles 302A-302D communicatively linked (e.g., via wired and/or wireless interfaces) to an external computing device 304. The vehicles 302A-302D and the computing device 304 may communicate within a network. Alternatively, the vehicles 302A-302D and the computing device 304 may each reside within a respective network.

The vehicles 302a-302d may be similar to the vehicles 100-200. For example, the vehicles 302a-302d may be partially or fully autonomous vehicles that each include a sensor (e.g., RADAR, etc.) to detect an environment of the vehicles 302A-302D. The vehicles 302A-302D may include components not shown in FIG. 3, such as a user interface, a communication interface, a processor, and data storage comprising instructions executable by the processor for carrying out one or more functions relating to the data sent to, or received by, the computing device 304. Further, the functions may also relate to control of the vehicles 302A-302D or components thereof, such as sensors, etc. To that end, the functions may also include methods and systems described herein.

The computing device 304 may be configured as a server or any other entity arranged to carry out the functions described herein. Further, the computing device 304 may be configured to send data/requests to the vehicles 302A-302D and/or to receive data from the vehicles 302A-302D.

For example, the computing device 304 may include a memory. The memory may include a database of various parameters for a vehicle. In some instances, the database may include calibration data and/or radar channel assignment information. The calibration data may include calibration information for a plurality of radar units, where the calibration data is associated with a serial number of a given radar unit. For example, after a radar unit is calibrated, the calibration information may be stored in the database of the computing device 304. As previously discussed, when a vehicle is initialized, such as one of vehicles 302A-302D, the vehicle may report the serial number of the radar units coupled the vehicle to the computing device 304. In response, the computing device 304 may communicate the calibration parameters of the radar units coupled to the vehicle to the respective vehicle. The computing device 304 may also communicate the channel information to the vehicle as well.

The computing device 304 includes a communication system 306, a processor 308, and data storage 310. The communication system 306 may be any system configured to communicate with the vehicles 302A-302D, or other entities, either directly or via a communication network, such as a wireless communication network. For example, the communication system 306 may include an antenna and a chipset for wirelessly communicating with the vehicles 302A-302D, servers, or other entities either directly or via a wireless communication network. Alternatively, in some examples, the communication system 306 may include a wired connection to a server or other entity in wireless communication with the vehicles 302A-302D. Accordingly, the chipset or the communication system 306 in general may be arranged to communicate according to one or more types of wireless communication (e.g., protocols) such as Bluetooth, communication protocols described in IEEE 802.11 (including any IEEE 802.11 revisions), cellular technology (such as GSM, CDMA, UMTS, EV-DO, WiMAX, LTE, or 5th generation "5G" cellular), Zigbee, dedicated short range communications (DSRC), and radio frequency identification (RFID) communications, among other possibilities, or one or more types of wired communication such as Local Area Network (LAN), etc. The communication system 306 may take other forms as well.

The processor 308 may comprise one or more general-purpose processors and/or one or more special-purpose processors. To the extent the processor 308 includes more than one processor, such processors could work separately or in combination. Data storage 310, in turn, may comprise one or more volatile and/or one or more non-volatile storage components, such as optical, magnetic, and/or organic storage, and data storage 310 may be integrated in whole or in part with the processor 308.

In some embodiments, data storage 310 may contain instructions 312 (e.g., program logic) executable by the processor 308 to execute various functions described herein. Data storage 310 may contain additional instructions as well, including instructions to transmit data to, receive data from, interact with, and/or control one or more of the vehicles 302A-302D. The data storage may also include data related to the location of vehicles 302A-302D as well as sensor locations and sensor fields of view for vehicles 302A-302D. The computer device 304 may additionally or alternatively include components other than those shown.

Figure 4:
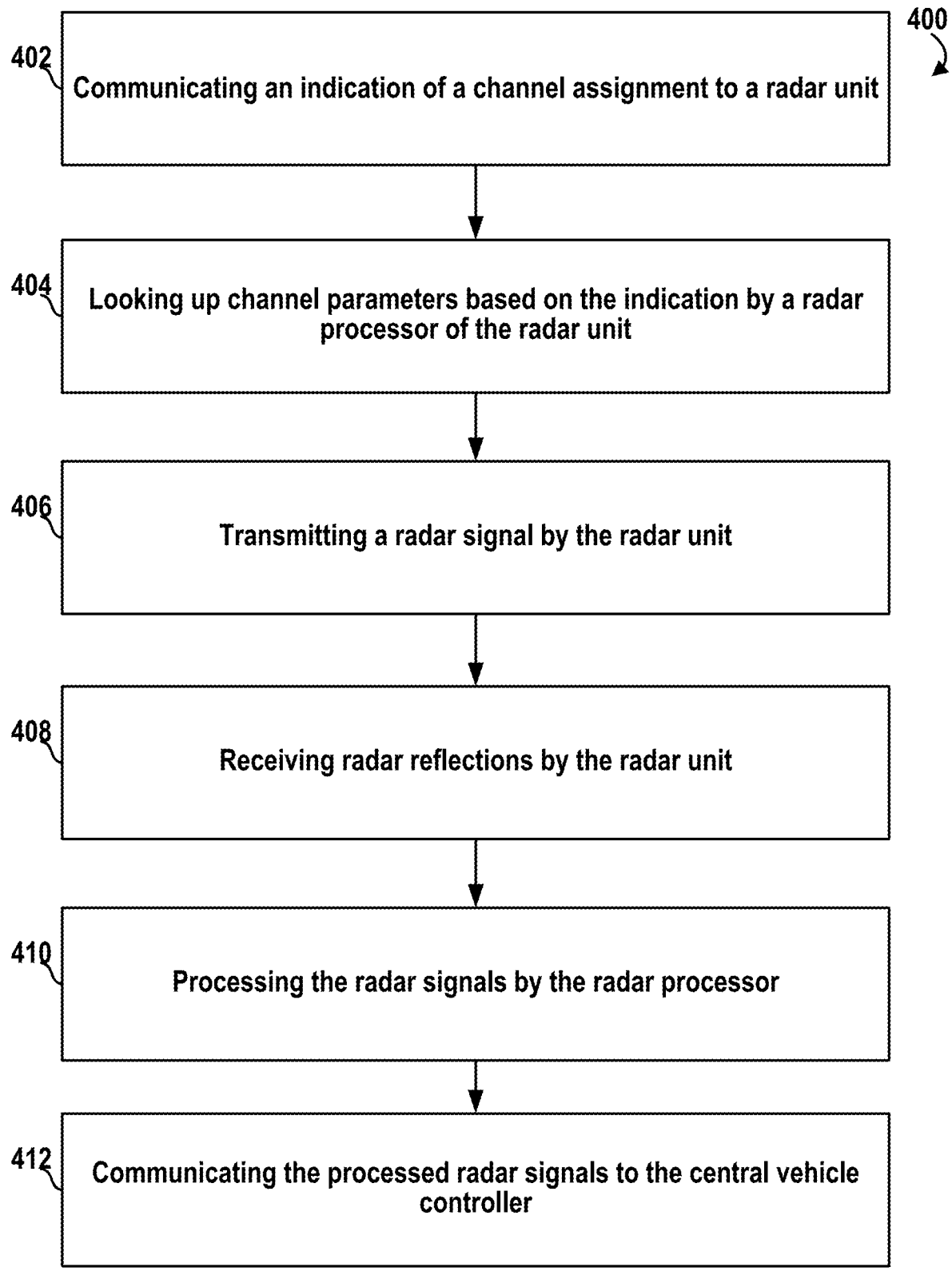
FIG. 4 is a block diagram of a method, according to an example embodiment.

FIG. 4 is a block diagram of a method 400, according to an example embodiment. Method 400 shown in FIG. 4 presents an embodiment of a method that could be used with the vehicles 100, 200, 250, 302A-302D, or the computing device 304, for example. Method 400 may include one or more operations, functions, or actions as illustrated by one or more of blocks 402, 404, and 406. Although the blocks are illustrated in a sequential order, these blocks may in some instances be performed in parallel, and/or in a different order than those described herein. Also, the various blocks may be combined into fewer blocks, divided into additional blocks, and/or removed based upon the desired implementation.

In addition, for the method 400 and other processes and methods disclosed herein, the flowchart shows functionality and operation of one possible implementation of present embodiments. In this regard, each block may represent a module, a segment, a portion of a manufacturing or operation process, or a portion of program code, which includes one or more instructions executable by a processor for implementing specific logical functions or steps in the process. The program code may be stored on any type of computer readable medium, for example, such as a storage device including a disk or hard drive. The computer readable medium may include non-transitory computer readable medium, for example, such as computer-readable media that stores data for short periods of time like register memory, processor cache and Random Access Memory (RAM). The computer readable medium may also include non-transitory media, such as secondary or persistent long term storage, like read only memory (ROM), optical or magnetic disks, compact-disc read only memory (CD-ROM), for example. The computer readable media may also be any other volatile or non-volatile storage systems. The computer readable medium may be considered a computer readable storage medium, for example, or a tangible storage device.

In addition, for the method 400 and other processes and methods disclosed herein, each block in FIG. 4 may represent circuitry that is wired to perform the specific logical functions in the process, for example.

The method 400 may describe a method for operating at least one radar unit of a vehicle. In some examples, the method 400 may be expanded to be performed by multiple radar units of a vehicle, such as when the vehicle features multiple radar units. The term channel as used throughout method 400 may refer to a single radio channel over one time period or may refer to a plurality of predetermined channel assignments from a set of channel assignments as previously discussed.

At block 402, the method 400 includes communicating an indication of a channel assignment to a radar unit. A central vehicle controller may be configured to communicate the indication of a channel assignment to one or more radar units of the vehicle. In some examples, the communication of the channel assignment may be an index value, such as an integer. The radar unit (at block 404) may be able to interpret the indication of the channel assignment to determine an operation of the radar unit. In some examples, the central vehicle controller may communicate a plurality of channel assignments to the radar unit. Each channel assignment of the plurality may correspond to a sequential transmission pattern by which a given radar unit should operate.

Examples may also involve the central vehicle controller being in communication (e.g., wireless communication) with a remote computing system. The remote computing system may assign and provide an indication of channel assignments for the radar units of each vehicle in communication with the remote computing system. The remote computing system may provide channel assignments based on potential interference between radar units of one or more vehicles.

In some examples, the remote computing system may be in communication with a plurality of vehicles. The remote computing system may determine radar channel assignments for each radar unit coupled to the plurality of vehicle in order to minimize radar interference. The determination may be based on both the location of the vehicles and the orientation of the radar sensor of the vehicles. Based on information related to the at least one vehicle of the plurality of vehicles, the system may determine potential interference between at least two radar units. In some examples, the two radar units may be located on one vehicle of the plurality of vehicles. In some other examples, the two radar units may be located on two different vehicles of the plurality of vehicles.

To facilitate the determination of the radar channel assignments, in some examples, the vehicle may include a location sensor similar to the GPS 226 of the vehicle 200 or any other location sensor, and relay the location information to the remote computing system. In these examples, the remote computing system may perform the determination based on a comparison between the location of the at least one other vehicle (e.g., indicated by the data) and location of the vehicle (e.g., indicated by the location sensor). Additionally, the vehicle may include an orientation sensor, such as a sensor similar to the IMU 228 of the vehicle 200. For example, data from the orientation sensor may be utilized by the remote computing system to determine an orientation and/or heading of the vehicle to facilitate determining the likelihood of interference when determining radar channel assignments. For example, the remote computing system may compare the orientation with orientations of the at least one other vehicle (and sensors thereon) to determine the likelihood of interference. Similarly, for example, the location of the vehicle may be compared with locations of the at least one other vehicle. Other examples are possible as well.

At block 404, the method 400 includes looking up channel parameters based on the indication by a radar processor of the radar unit. As previously discussed, a memory of each radar unit may have stored information related to radar channel assignments. The stored information may include frequency, timing, power, and/or other radar parameters (example channel assignment parameters are discussed with respect to FIGS. 9A and 9B). As previously discussed, during an initialization sequence for the vehicle. The vehicle may download data from a remote computing system. This data may include a set of radar channel parameters. Once this radar channel parameter data is downloaded, the central vehicle controller may responsively communicate the radar channel parameter data to each radar unit.

In practice, when a radar unit receives the indication of a channel assignment, a processor of the radar unit may look up the associated radar channel parameters of the given channel assignment. The channel assignment may be communicated to the radar unit in the form of an index value, such as an integer. The index value may not directly contain radar channel information, but may be used as a reference by the processor of the radar unit to look up the channel information. For example, based on the index value, the processor of the radar unit may look up the channel frequency and timing information based on the indication of the channel assignment.

In instances where the central vehicle controller communicates a plurality of channel assignments to the radar unit, the processor of the radar unit may look up the radar channel parameters for each channel assignment and store them in a cache for use by the radar transmitter. The radar transmitter may use a given channel assignment based on timing indicated by the central vehicle controller (and possibly received from a remote computing system that provides radar planning).

Additionally, the data received by the central processor may contain calibration information for each radar unit coupled to the vehicle. As previously discussed, when a radar unit is installed on a vehicle, an identification number of the radar unit may be stored in the remote computer system. Additionally, when a radar unit is calibrated, the calibration data may be stored in the remote computer system. When a vehicle is turned on (or an initiation sequence on a vehicle is performed), the vehicle may initiate wireless communication between itself and the remote computing system. The remote computing system may send the calibration data for each respective radar unit of the vehicle to the central vehicle controller. The remote computer system may also communicate a set of channel assignments to the central vehicle controller. The set of channel assignments may include channel frequency, timing, and/or modulations for the operation of the radar unit(s) of the vehicle.

The central vehicle controller may communicate calibration information to a memory of each respective radar unit of the vehicle based on a serial number of the radar unit. By communicating the calibration information to the radar units, the respective radar units may be controlled and data from them may be processed, based on a calibration of the radar unit. Further, the central processing unit may also communicate the set of channel assignments to the memory of each respective radar unit. Thus, a radar process of the radar unit may be able to look up information for a given channel assignment when operating the radar unit.

At block 406, the method 400 includes transmitting a radar signal by the radar unit. The radar signal transmitted by the radar unit may have the properties associated with a given channel assignment. The radar signal may be transmitted with frequency and/or timing specified by the channel assignment. For example, a channel may specify frequency and timing parameters for a signal transmitted by the radar unit. In practice, when a radar unit operates it may transmit a signal on a channel. Each radar unit of the vehicle and nearby vehicles may each be assigned a channel assignment to mitigate interference between the various radar units. Additionally, in some examples, a radar processor may make calibration-adjustments to the signal for transmission based on the calibration data stored for the respective radar unit.

By way of example, the channel may also specify a modulation pattern of the transmitted signal. In some examples, the transmitted signal may be a linearly frequency modulated (LFM) RADAR modulation, where the frequency of the EM radiation is adjusted over time in accordance with the modulation pattern. In another example, different channel assignments may also comprise adjusting the modulation pattern by applying an offset, among other possibilities, to distinguish one channel from another based on the respective modulation patterns. In this example, the offset may be a frequency offset or a time offset. In another example, the vehicle may adjust the modulation pattern by adjusting a frequency bandwidth or a shape of the modulation pattern. In yet another example, the vehicle may adjust the modulation pattern by applying a particular phase-shift keying (PSK) modulation scheme to the signal transmitted by the sensor, and the receiver may filter the incoming signal based on the particular PSK scheme (e.g., to distinguish the signal transmitted by the sensor from other signal transmitted by other sensors of other vehicles). PSK is a digital modulation scheme that conveys data by changing, or modulating, a phase of the transmitted EM radiation. For example, the transmitted signal may be conditioned to have a finite number of phases, each assigned a unique pattern of binary digits, and the pattern of binary digits may be detected at a digital signal processor coupled to the receiver of the sensor to identify the source of the signal. Various PSK schemes are possible such as Binary phase-shift keying (BPSK), Quadrature phase-shift keying (QPSK), High-order PSK, Differential phase-shift keying (DPSK), etc.

At block 408, the method 400 includes receiving radar reflections by the radar unit. Once radar signals are transmitted by a radar unit, they propagate through the environment and strike objects within the field of view of the radar unit. When the radar signals strike the objects, a portion of the energy that strikes the object may reflect back to the radar unit. An antenna array or single antenna of the radar unit may receive the received reflected signals.

At block 410, the method 400 includes processing the reflected radar signals by the radar processor. In some examples, the radar processor of the radar unit may perform some processing of the received radar signals. In some examples, the radar processor may process the radar signals to determine the distance and direction to target objects that reflected radar signals back to the radar unit. The radar processor may also process the received radar signals based on the calibration data stored in the memory of the radar unit. Additionally, at block 410, the processing may include performing digital beamforming on the received signals. By performing digital beamforming, the direction of arrival of the received signals may be resolved from the received signals. Thus, the direction from which the reflected signals came may be determined.

In some instances, block 410 may be omitted and the raw radar reflection data may be communicated to the central vehicle processor for processing.

At block 412, the method 400 includes communicating the processed radar signals to the central vehicle controller. The radar unit communicates the processed radar signals to the central vehicle controller so the central vehicle controller can make determinations about the object(s) that reflected radar signals back to the vehicle. In some examples, a plurality of radar units may communicate processed radar signals back to the central vehicle controller. The central vehicle controller may determine objects that caused the reflections and responsively control the vehicle in an autonomous mode of operation. Additionally, in some examples, the central vehicle controller may further process the processed radar signals before making determinations. In some examples, the calibration data may be stored in a memory accessible by the central vehicle controller. The central vehicle controller may be able to further process the processed radar signals based on the calibration data.

Figure 5:
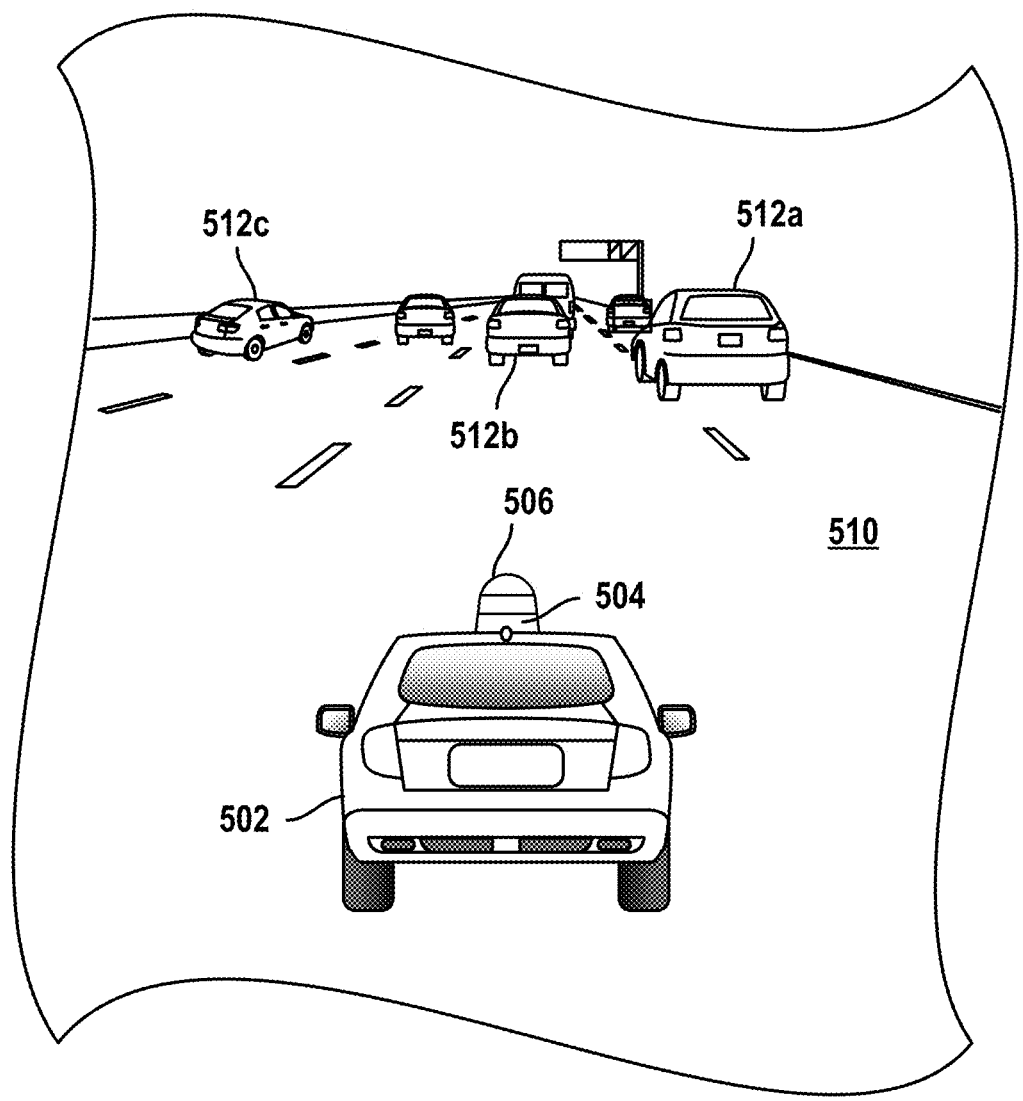
FIG. 5 illustrates a plurality of vehicles within an environment of a vehicle that includes a sensor, according to an example embodiment.

FIG. 5 illustrates a plurality of vehicles 512a-512c within an environment of a vehicle 502 that includes a sensor 506, according to an example embodiment. Although sensor 506 is shown on the roof of vehicle 502, it should be understood that sensor 506 may be located in the location(s) described with respect to FIG. 2B and have a field of view similar to that described with respect to FIG. 2B.

The vehicles 502 and 512a-c may be similar to the vehicles 100, 200, 302a-302d of FIGS. 1-3. For example, the vehicle 502 may include the sensor 506 (e.g., RADAR, LIDAR, etc.) similar to the radar unit 206 and/or the lidar unit 202 or 208 of the vehicle 200. Further, the vehicle 502 includes a mount 504 ("steering device") configured to adjust a direction of the sensor 506. The mount 504, for example, may be a moveable mount comprising materials suitable for supporting the sensor 506 and may be operated by a control system (not shown) to rotate, tilt or pivot the sensor 506 about a mount axis to modify the direction of the sensor 506. Alternatively, the mount 504 may modify the direction of the sensor 506 in a different manner. For example, the mount 504 (e.g., steering device) may translate the sensor 506 along a horizontal plane, etc.

As illustrated in FIG. 5, the vehicles 502 and 512a-512c are traveling on a road 510. Further, the vehicles 512a-512c may include sensors (not shown in FIG. 5) that may interfere with operation of the sensor 506 of the vehicle 502. Various scenarios to reduce interference between such sensors and the sensor 506 in accordance with the present disclosure are presented below.

In an example scenario, the vehicle 512b may also include a backward facing sensor (not shown) that is directed towards the sensor 506. In this scenario, for example, the radar planning system may assign different radar channels to the potentially interfering radars. The radar planning system may communicate the radar channel assignments to the respective vehicles, along with instructions to operate the radar units based on the channel assignments. Each vehicle may responsively adjust the channel of operation for the respective sensor 506 to reduce interference between the sensor of the vehicle 512b and the sensor 506 of the vehicle 502. Other examples are possible as well.

In another scenario, the vehicle 512c may also include a backward facing sensor (not shown) that is directed towards the sensor 506. In this scenario, the sensor of the vehicle 512c may receive signals from the sensor 506 that interfere with the sensor of the vehicle 512c. Accordingly, in the scenario, the vehicle 502 may reduce power of the signal from the sensor 506 such that the signal may not significantly interfere with the sensor of the vehicle 512c after traversing a given distance to the vehicle 512c. Other scenarios are possible as well in accordance with the present disclosure.

Figure 6:
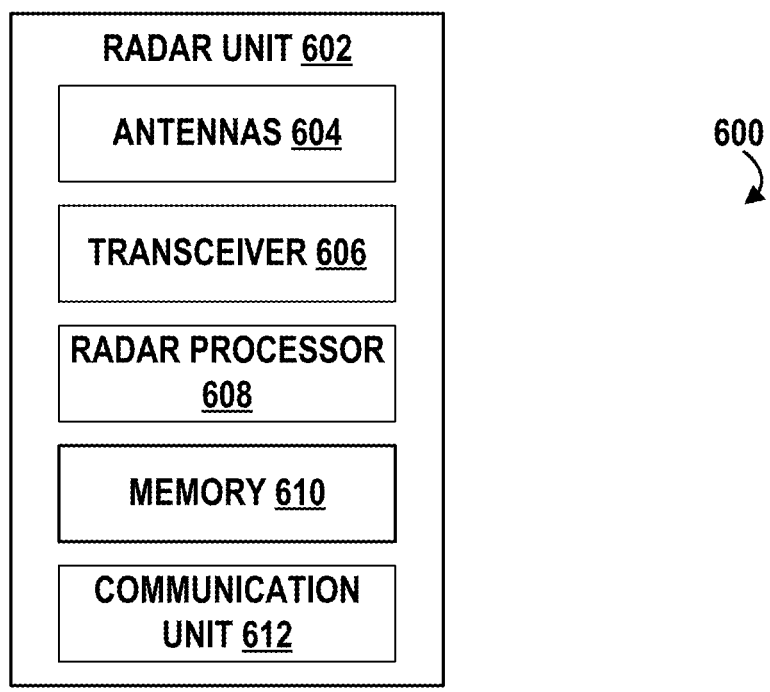
FIG. 6 is a simplified block diagram of a radar unit, according to an example embodiment.

FIG. 6 is a simplified block diagram of a radar unit 600, according to an example embodiment. The radar unit 602 is one example of possible circuitry for a radar unit 600. The radar unit 602 includes antennas 604, a transceiver 606, a radar processor 608, a memory 610, and a communication unit 612. The radar unit 600, for example, may be similar to the radar unit 206 of the vehicle 200.

It is noted that the blocks 602-612 are for exemplary purposes only. In some examples some of the blocks in the radar unit 600 may be combined or divided into other blocks. For example, FIG. 6 shows a single transceiver 606. The transceiver 606 may include one or more transmitters and receivers. In some embodiments the transceiver 606 may include multiple transmitters and/or receivers. In one example configuration, the transceiver 606 may include 2 transmitters and 4 receivers. In another example configuration, the transceiver 606 may include 4 transmitters and 8 receivers. Other examples are possible as well.

The antennas 604 may be arranged in one or more arrays. In some examples the radar unit 602 may have one or more transmission arrays or one or more reception arrays. In some other examples, either the transmission array or the reception array of the antennas 604 may be replaced by a single element antenna. In yet further examples, antennas 604 may include a single transmission antenna and a single reception antenna. In some examples, an array that forms antennas 604 may function as both a transmission and a reception array.

As previously discussed, transceiver 606 may include one or more transmitters and receivers. The transmitters may function to create a radar signal for transmission by the antennas 604. The transmitters may create the radar signals based on a channel assignment for the radar unit 602. The transmitters may include a digital to analog processor used to convert a digital radar signal from the radar processor 608. The receivers may function to down-convert radar reflections received by the antennas 604. The receivers may include an analog to digital processor used to convert analog received signals to digital signals for communication to the radar processor 608.

The radar processor 608 may function to both process the received down-converted radar signals from the receivers as well as to provide data or instruction to the transmitters based on the channel assignment. In some examples, the radar processor 608 may look up radar channel properties from the memory 610. The radar channel properties will dictate how the radar processor 608 instructs the transmitter and receiver to operate. The radar processor 608 may also perform signal processing based on calibration data stored in the memory 610.

Additionally, the radar processor 608 may include a digital signal processor (DSP). The DSP may include any digital signal processing device or algorithm to process the data from the receivers for determination of range, angle, or velocity of the one or more objects in the environment of the sensor 600. The DSP, for example, may include one or more processors. In one example, the DSP may be configured to determine a Binary Phase-Shift keying (BPSK) scheme of the signal received by the receiver. In this example, the DSP may identify the source of the received EM radiation. For example, the BPSK scheme of the transmitted EM radiation by the transmitter may be compared with the BPSK scheme of the EM radiation received by the receiver.

The memory 610 may be configured to store data related to the operation of the radar unit 602. The memory 610 may store a serial number that is unique to the radar unit 602. In some examples, the memory 610 may also store calibration data related to the radar unit 602. Additionally, the memory 610 may also store channel parameters that include timing and frequency information for a plurality of radar channels upon which the radar unit 602 may operate.

The radar unit 602 also includes a communication unit 612. The communication unit 612 of the radar unit 602 may communicably couple the radar unit 602 to a central vehicle controller. The communication unit 612 may enable the central vehicle controller to communicate the calibration information and the channel parameters to the radar unit 602, which may responsively be stored in the memory 610. The communication unit 612 may also enable the radar unit 602 to communicate processed radar signals from the radar unit 602 to the central vehicle controller.

Figure 7:
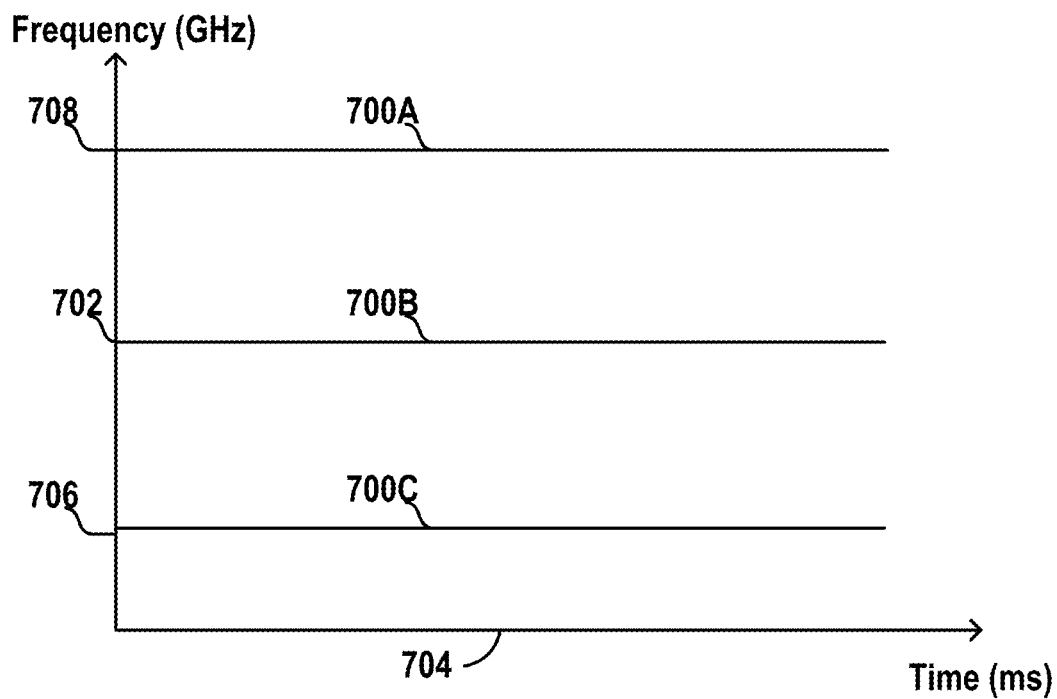
FIG. 7 illustrates example radar channels of a traditional radar system.

FIG. 7 illustrates example radar channels of a traditional radar system. FIG. 7 shows three example radar channels 700A-700C upon which radar units may transmit radar signals. The three example radar channels 700A-700C may exist in a bandwidth between particular frequencies, such as the frequencies 706 and 708. The minimum frequency 706 and the maximum frequency 708 could, for example, span a frequency range of 76 GHz to 77 GHz, part of this frequency range, or some other frequency range, with a center frequency 702 at 76.5 GHz, as an example. In the example shown in FIG. 7, each radar channel is assigned a specific frequency of operation across all time 704.

Each radar channel may have an associated bandwidth. Thus, for a given radar bandwidth defined by the minimum frequency 706 and the maximum frequency 708, the total number of channels that may operate in the radar bandwidth is equal to the total radar bandwidth divided by the bandwidth of a single channel. For example, if the radar bandwidth is equal to 1 GHz and each channel has a 20 MHz bandwidth, the radar bandwidth may support 50 channels. Therefore, the radar system of this example may be limited to 50 radar units within a given region, in order to mitigate potential interference.

In order to support more radar units in a given region, a radar system may use different techniques to support more radar channels in a given bandwidth. As previously discussed, different modulations, signaling modes, and other techniques may be used to increase the number of channels that a bandwidth can support. Thus, the present radar system uses different radar signaling than shown in FIG. 7, to support more radar units operating simultaneously in a given region.

Figure 8:
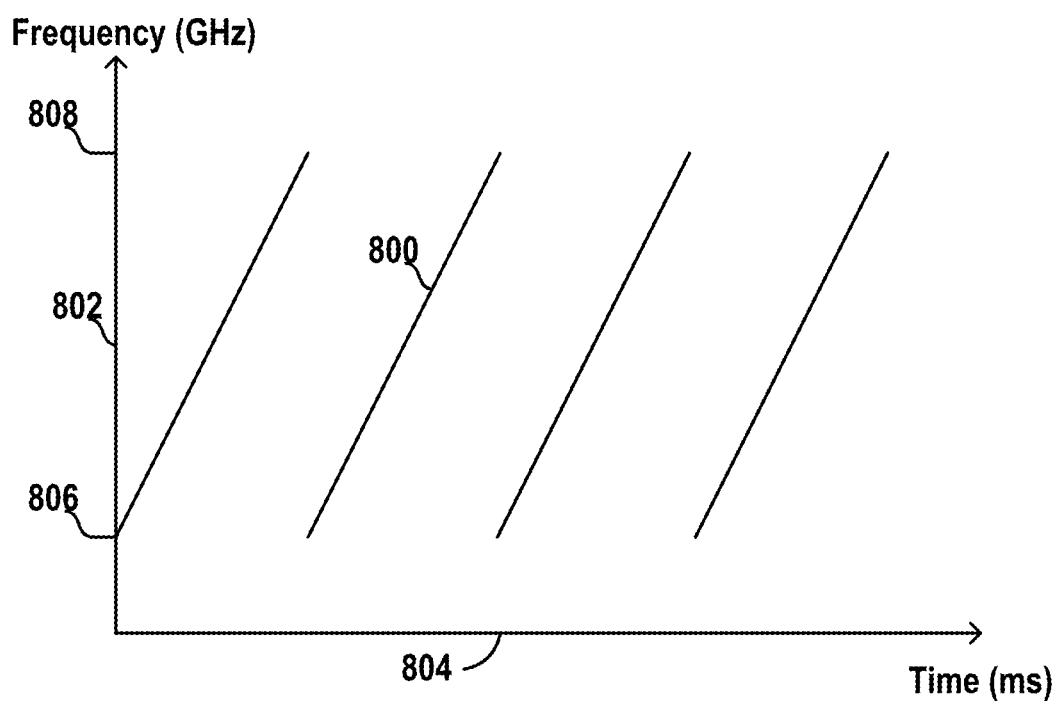
FIG. 8 illustrates a modulation pattern of electromagnetic (EM) radiation from a sensor, according to an example embodiment.

FIG. 8 illustrates a modulation pattern 800 of electromagnetic (EM) radiation for a given channel from a sensor, according to an example embodiment. The modulation pattern 800 may correspond to the linear frequency modulated ramp wave provided by a local oscillator in the sensor similar to the local oscillator 602 of the sensor 600. FIG. 8 shows the modulation pattern 800 along a frequency axis 802 (vertical axis) and a time axis 804 (horizontal axis). The modulation pattern 800 may correspond to a single channel for a radar system.

Thus, for example, the EM radiation may have a continuously changing frequency between a minimum frequency 806 and a maximum frequency 808. The minimum frequency 806 and the maximum frequency 808 could, for example, span a frequency range of 76 GHz to 77 GHz, part of this frequency range, or some other frequency range. In the example shown in FIG. 8, the modulation pattern 800 corresponds to a linear ramp pattern. However, in other examples, the shape of the modulation pattern 800 may correspond to any other shape such as a sawtooth pattern, a square wave pattern, a sine wave pattern, triangular pattern, or any other shape.

Additionally, the modulation pattern 800 is shown with a linear ramp between a first frequency 806 and a second frequency 808. When the linear ramp reaches the second frequency 808, the linear ramp may begin again at the first frequency 806. In some examples, the linear ramp may begin again at approximately the time right after the linear ramp reaches the second frequency 808. In some other examples, there may be a delay of a predetermined amount of time between when the linear ramp reaches the second frequency 808 and when it starts transmitting again at the first frequency 806. Thus, for the duration of the predetermined amount of time, the system may not transmit any signal at all.

In an example operation of a sensor, such as the sensor 600, the EM radiation having the modulation pattern 800 may be transmitted by a transmitter (e.g., the transmitter 604) and a reflection of the modulation pattern 800 may be received by a receiver (e.g., the receiver 606). By comparing the modulation pattern 800 of the transmitted wave with a modulation pattern of the reflected wave distances and velocities of objects in the environment of the sensor may be determined. For example, the time offset between the transmitted wave and the received wave may be utilized to determine the distance (e.g., range) to the object. Further, for example, a change in the slope of the modulated pattern 800 may be utilized to determine the velocity of the object (e.g., Doppler velocity, etc.) relative to the sensor.

Figure 9A:
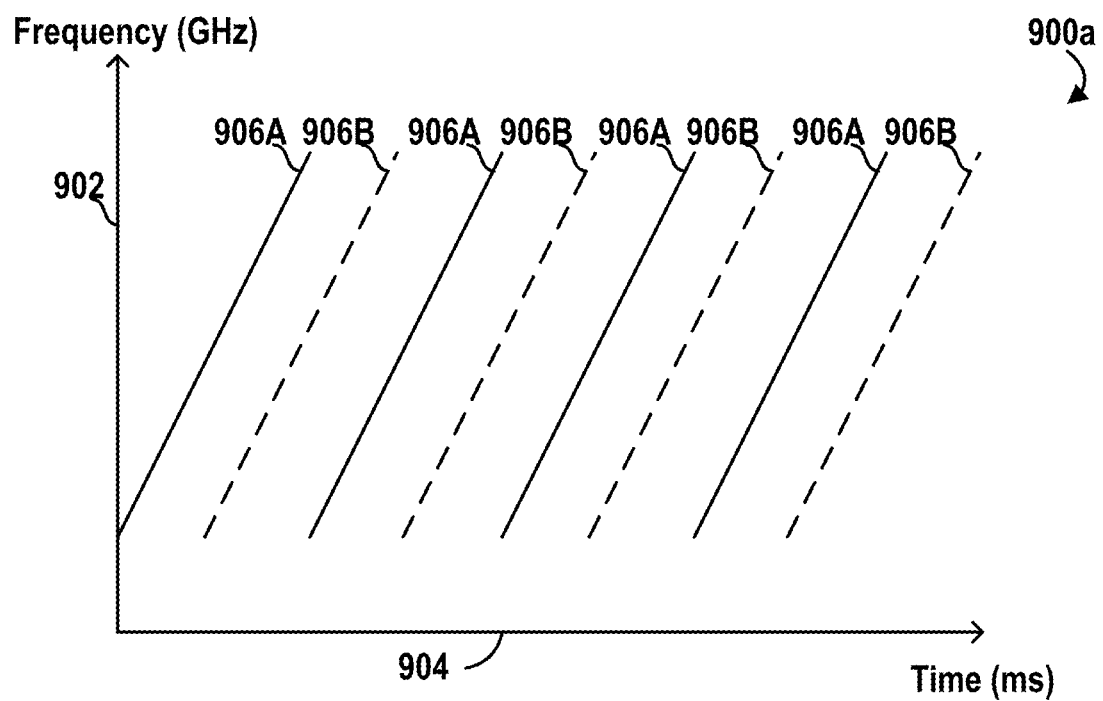
FIG. 9A illustrates an example scenario for assigning channels, in accordance with at least some embodiments herein.
Figure 9B:
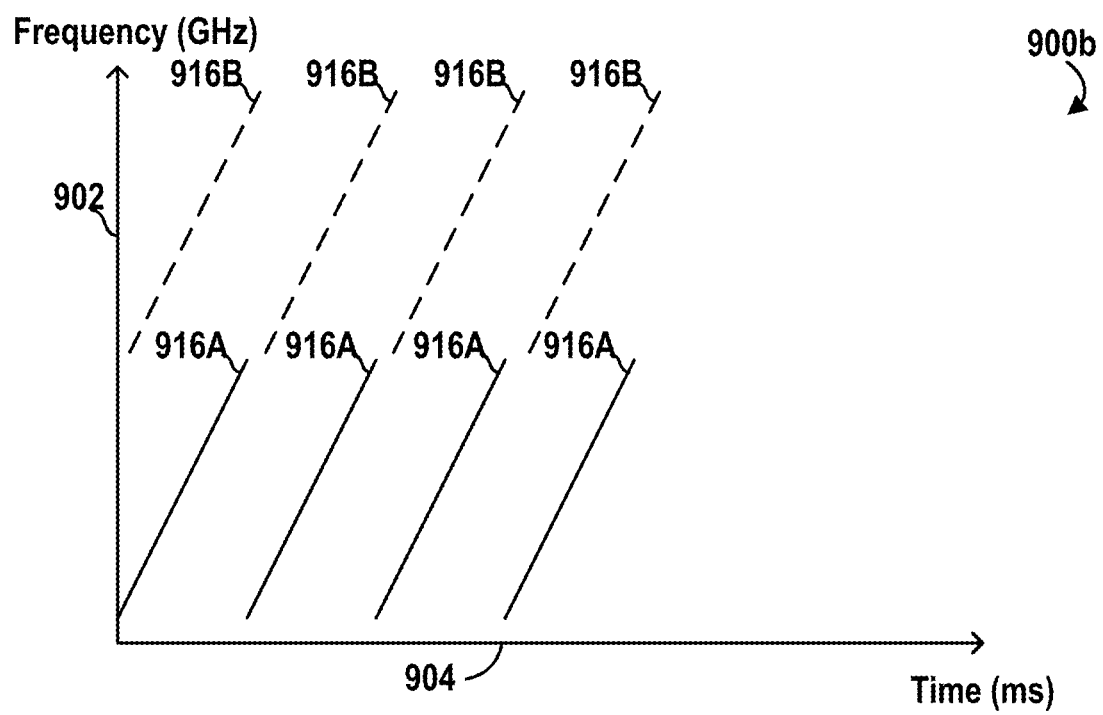
FIG. 9B illustrates another example scenario for assigning channels, in accordance with at least some embodiments herein.

FIGS. 9A and 9B illustrate two example scenarios 900*a* and 900*b* for multiple channels of the transmission of radar signals described with respect to FIG. 8. The scenarios 900*a* and 900*b* present two example channels along a frequency axis 902 and a time axis 904 that are similar, respectively, to the frequency axis 802 and the time axis 804 of FIG. 8. In FIGS. 9A and 9B, first channel 906A and 916A may correspond to modulated patterns of EM radiation from a first sensor, and second channel 906B and 916B may correspond to modulated patterns of EM radiation from a second sensor. The scenarios 900A and 900B present various adjustments of the corresponding modulation patterns to reduce interference in accordance with the present disclosure.

In scenario 900A of FIG. 9A, the second channel 906B upon which the second sensor transmits may be offset in time from the first channel 906A. For example, the time offset may locate transmissions on the second channel 906B in the middle of the time period between consecutive transmissions by the first channel 906A. Accordingly, a filter such as the IF filter 610 of the sensor 600 may be able to resolve the desired channel of the two channels at each respective radar unit. Thus, each radar unit may not have interference from the other radar unit operating on the channel. In practice, there may be more than two channels, and the channels may be more tightly spaced than shown in 900A.

As previously discussed, in some examples, a radar planning system of a remote computing system may be able to determine when two channels are too closely spaced for transmissions by two radar units on the two channels to not interfere with each other. Therefore, the radar planning system may determine situations where channels may cause interference and assign radar channels to radar units of vehicles minimize potential interference.

In scenario 900B of FIG. 9B, the second channel 916B upon which the second sensor transmits may be offset in frequency from the first channel 916A. For example, the frequency offset may locate transmissions on the second channel 916B in a different range of frequencies from transmissions on the first channel 916A. Accordingly, a filter such as the IF filter 610 of the sensor 600 may be able to resolve the desired channel of the two channels at each respective radar unit. Thus, each radar unit may not have interference from the other radar unit operating on the channel. In practice, there may be more than two channels, and the channels may more tightly spaced than shown in 900A. Scenarios 900A and 900B of FIGS. 9A and 9B are illustrated for exemplary purposes only. Other scenarios are possible for adjusting the modulation pattern of a sensor to reduce the interference in accordance with the present disclosure. Additionally, in some examples, the time division shown in 900A and the frequency division shown in 900B may be combined to form even more channels.

Figure 10:
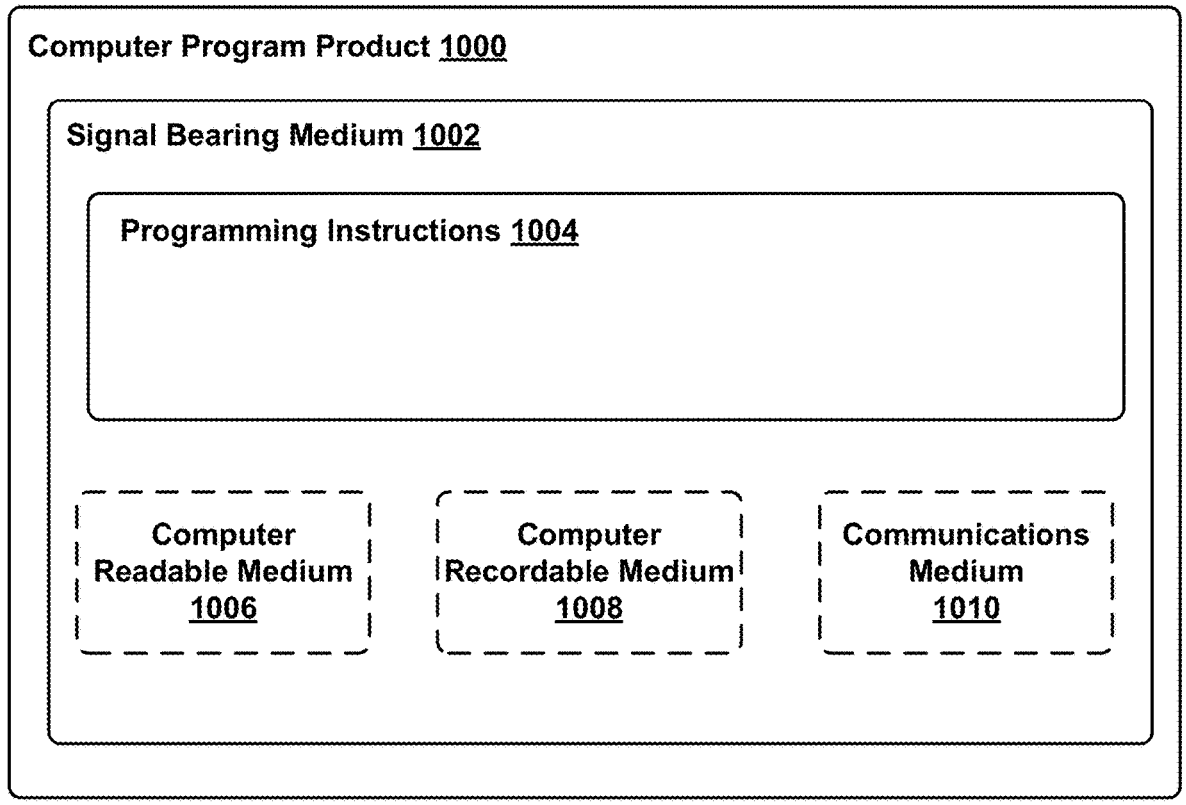
FIG. 10 depicts an example computer readable medium configured according to an example embodiment.

FIG. 10 depicts an example computer readable medium configured according to an example embodiment. In example embodiments, an example system may include one or more processors, one or more forms of memory, one or more input devices/interfaces, one or more output devices/interfaces, and machine readable instructions that when executed by the one or more processors cause the system to carry out the various functions tasks, capabilities, etc., described above.

As noted above, in some embodiments, the disclosed techniques (e.g., methods 400, etc.) may be implemented by computer program instructions encoded on a computer readable storage media in a machine-readable format, or on other media or articles of manufacture (e.g., instructions 216 of the vehicle 200, instructions 312 of the computing device 304, etc.). FIG. 10 is a schematic illustrating a conceptual partial view of an example computer program product that includes a computer program for executing a computer process on a computing device, such as on a radar planning system, arranged according to at least some embodiments disclosed herein.

In one embodiment, the example computer program product 1000 is provided using a signal bearing medium 1002. The signal bearing medium 1002 may include one or more programming instructions 1004 that, when executed by one or more processors may provide functionality or portions of the functionality described above with respect to FIGS. 1-9. In some examples, the signal bearing medium 1002 may be a computer-readable medium 1006, such as, but not limited to, a hard disk drive, a Compact Disc (CD), a Digital Video Disk (DVD), a digital tape, memory, etc. In some implementations, the signal bearing medium 1002 may be a computer recordable medium 1008, such as, but not limited to, memory, read/write (R/W) CDs, R/W DVDs, etc. In some implementations, the signal bearing medium 1002 may be a communication medium 1010 (e.g., a fiber optic cable, a waveguide, a wired communications link, etc.). Thus, for example, the signal bearing medium 1002 may be conveyed by a wireless form of the communications medium 1010.

The one or more programming instructions 1004 may be, for example, computer executable and/or logic implemented instructions. In some examples, a computing device may be configured to provide various operations, functions, or actions in response to the programming instructions 1004 conveyed to the computing device by one or more of the computer readable medium 1006, the computer recordable medium 1008, and/or the communications medium 1010.

The computer readable medium 1006 may also be distributed among multiple data storage elements, which could be remotely located from each other. The computing device that executes some or all of the stored instructions could be an external computer, or a mobile computing platform, such as a smartphone, tablet device, personal computer, wearable device, etc. Alternatively, the computing device that executes some or all of the stored instructions could be remotely located computer system, such as a server, or a distributed cloud computing network.

It should be understood that arrangements described herein are for purposes of example only. As such, those skilled in the art will appreciate that other arrangements and other elements (e.g. machines, interfaces, functions, orders, and groupings of functions, etc.) can be used instead, and some elements may be omitted altogether according to the desired results. Further, many of the elements that are described are functional entities that may be implemented as discrete or distributed components or in conjunction with other components, in any suitable combination and location, or other structural elements described as independent structures may be combined.

While various aspects and embodiments have been disclosed herein, other aspects and embodiments will be apparent to those skilled in the art. The various aspects and embodiments disclosed herein are for purposes of illustration and are not intended to be limiting, with the true scope being indicated by the following claims, along with the full scope of equivalents to which such claims are entitled. It is also to be understood that the terminology used herein is for the purpose of describing particular embodiments only, and is not intended to be limiting.

What is claimed is:

1. A method comprising:
   obtaining, at a central vehicle controller of a vehicle, calibration data for a radar system of the vehicle;
   communicating, by the central vehicle controller, first calibration information to a first radar coupled to the vehicle based on a first serial number corresponding to the first radar and second calibration information to a second radar coupled to the vehicle based on a second serial number corresponding to the second radar, wherein the first calibration information is a first subset of the calibration data and the second calibration information is a second subset of the calibration data, and wherein the first calibration information differs from the second calibration information; and
   causing the first radar to transmit first radar signals based on the first calibration information and the second radar to transmit second radar signals based on the second calibration information.

2. The method of claim 1, wherein obtaining calibration data for the radar system comprises:
   receiving the calibration data for the radar system from a remote computing system.

3. The method of claim 1, further comprising:
   obtaining configuration data for the radar system; and
   based on the configuration data, communicating first configuration parameters to the first radar and second configuration parameters to the second radar.

4. The method of claim 3, wherein causing the first radar to transmit first radar signals based on the first calibration information and the second radar to transmit second radar signals based on the second calibration information comprises:
   causing the first radar to transmit the first radar signals further based on the first configuration parameters and the second radar to transmit the second radar signals further based on the second configuration parameters.

5. The method of claim 3, wherein communicating first configuration parameters to the first radar and second configuration parameters to the second radar comprises:
   communicating a first channel assignment to the first radar and a second channel assignment to the second radar, wherein the first channel assignment differs from the second channel assignment.

6. The method of claim 5, wherein communicating the first channel assignment to the first radar and the second channel assignment to the second radar comprises:
   communicating a first plurality of channel assignments to the first radar, wherein each channel assignment in the first plurality of channel assignments corresponds to a first sequential transmission pattern for operation by the first radar; and
   communicating a second plurality of channel assignments to the second radar, wherein each channel assignment in the second plurality of channel assignments corresponds to a second sequential transmission pattern for operation by the second radar.

7. The method of claim 6, wherein the first radar is configured to dynamically change channel assignment based on the first plurality of channel assignments, and
   wherein the second radar is configured to dynamically change channel assignment based on the second plurality of channel assignments.

8. The method of claim 1, wherein communicating first calibration information to the first radar coupled to the vehicle and second calibration information to the second radar coupled to the vehicle comprises:
   communicating the first calibration information to a first processor corresponding to the first radar; and
   communicating the second calibration information to a second processor corresponding to the second radar.

9. The method of claim 1, wherein communicating first calibration information to the first radar coupled to the vehicle and second calibration information to the second radar coupled to the vehicle comprises:
   communicating the first calibration information to a first memory located at the first radar; and
   communicating the second calibration information to a second memory located at the second radar.

10. The method of claim 1, further comprising:
    responsive to obtaining the calibration data for the radar system, storing the calibration data in a memory accessible by the central vehicle controller.

11. The method of claim 10, further comprising:
    detecting interference in radar data obtained by the radar system; and
    looking up the first calibration information and the second calibration information from the memory accessible by the central vehicle controller; and
    wherein communicating first calibration information to the first radar coupled to the vehicle and second calibration information to the second radar coupled to the vehicle comprises:
    communicating the first calibration information and the second calibration information after looking up the first calibration information and the second calibration information from the memory.

12. The method of claim 1, further comprising:
    receiving, at the central vehicle controller, first processed radar signals from the first radar and second processed radar signals from the second radar; and determining a control strategy for the vehicle based on the first processed radar signals and the second processed radar signals.

13. The method of claim 12, further comprising:
controlling, by the central vehicle controller, the vehicle based on the control strategy.

14. The method of claim 1, wherein communicating first calibration information to the first radar coupled to the vehicle and second calibration information to the second radar coupled to the vehicle comprises:
communicating the first calibration information to a first register located at the first radar, wherein the first radar transmits signals based on information stored at the first register; and
communicating the second calibration information to a second register located at the second radar, wherein the second radar transmits signals based on information stored at the second register.

15. A vehicle comprising:
a radar system having a first radar and a second radar; and
a central vehicle controller configured to:
obtain calibration data for the radar system;
communicate first calibration information to the first radar based on a first serial number corresponding to the first radar and second calibration information to the second radar based on a second serial number corresponding to the second radar, wherein the first calibration information is a first subset of the calibration data and the second calibration information is a second subset of the calibration data, and wherein the first calibration information differs from the second calibration information; and
cause the first radar to transmit first radar signals based on the first calibration information and the second radar to transmit second radar signals based on the second calibration information.

16. The vehicle of claim 15, wherein the first radar and the second radar are forward-facing radars coupled proximate a front of the vehicle.

17. The vehicle of claim 15, wherein the central vehicle controller is further configured to:
receive the calibration data for the radar system from a remote computing system.

18. The vehicle of claim 17, wherein the central vehicle controller is further configured to:
responsive to obtaining the calibration data for the radar system, store the calibration data in a memory accessible by the central vehicle controller.

19. A non-transitory computer-readable medium, having stored thereon program instructions that, when executed by a computing system, cause the computing system to perform operations comprising:
obtaining calibration data for a radar system of a vehicle;
communicating first calibration information to a first radar coupled to the vehicle based on a first serial number corresponding to the first radar and second calibration information to a second radar coupled to the vehicle based on a second serial number corresponding to the second radar, wherein the first calibration information is a first subset of the calibration data and the second calibration information is a second subset of the calibration data, and wherein the first calibration information differs from the second calibration information; and
causing the first radar to transmit first radar signals based on the first calibration information and the second radar to transmit second radar signals based on the second calibration information.

20. The method of claim 1, wherein communicating first calibration information to the first radar comprises:
communicating first calibration information to first random access memory (RAM) accessible only by the first radar; and
wherein communicating second calibration information to the second radar comprises:
communicating second calibration information to second RAM accessible only by the second radar.

\* \* \* \* \*